(12) United States Patent
Fukuda et al.

(10) Patent No.: US 8,582,207 B2
(45) Date of Patent: Nov. 12, 2013

(54) HARD COATING FILM, MANUFACTURING METHOD THEREOF, ANTIREFLECTIVE FILM, POLARIZING PLATE AND IMAGE DISPLAY UNIT

(75) Inventors: Kenichi Fukuda, Kanagawa (JP); Yasuyuki Sasada, Kanagawa (JP); Hiroyuki Yoneyama, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 396 days.

(21) Appl. No.: 12/923,600

(22) Filed: Sep. 29, 2010

(65) Prior Publication Data

US 2011/0075261 A1   Mar. 31, 2011

(30) Foreign Application Priority Data

Sep. 30, 2009   (JP) ................................. 2009-229022

(51) Int. Cl.
| | |
|---|---|
| *G02B 1/10* | (2006.01) |
| *G02B 5/02* | (2006.01) |
| *G02B 13/20* | (2006.01) |
| *G02F 1/1335* | (2006.01) |

(52) U.S. Cl.
USPC ............ 359/580; 359/599; 349/112; 349/137

(58) Field of Classification Search
USPC ............ 359/580, 581, 599, 614; 349/62, 112, 349/137
See application file for complete search history.

(56) References Cited

U.S. PATENT DOCUMENTS

| | | | | |
|---|---|---|---|---|
| 5,709,922 | A | * | 1/1998 | Ono et al. ...................... 428/156 |
| 2003/0077437 | A1 | * | 4/2003 | Nakamura et al. ............ 428/327 |
| 2004/0105646 | A1 | * | 6/2004 | Fukuda et al. ................ 385/129 |
| 2009/0002608 | A1 | * | 1/2009 | Kameyama et al. ........... 349/96 |
| 2009/0053465 | A1 | * | 2/2009 | Scherg et al. ................. 428/137 |

FOREIGN PATENT DOCUMENTS

| | | |
|---|---|---|
| JP | 7-287102 | 10/1995 |
| JP | 11-153703 | 6/1999 |
| JP | 2004-345333 | 12/2004 |
| JP | 2005-014479 | 1/2005 |
| JP | 2006/299042 A | 11/2006 |
| JP | 2007-084815 | 4/2007 |

OTHER PUBLICATIONS

Office Action issued by Japanese Patent Office (JPO) on Jul. 23, 2013, in connection with corresponding Japanese Patent Application No. 2009-229022.

* cited by examiner

*Primary Examiner* — Alessandro Amari
(74) *Attorney, Agent, or Firm* — Jean C. Edwards; Edwards Neils PLLC

(57) ABSTRACT

A hard coating film is provided and includes a transparent plastic substrate film, and a hard coating layer. The transparent plastic substrate film has mutually independent microscopic pits in at least one surface thereof, the microscopic pits each independently have a depth of 3 μm or below, the microscopic pits have an average length of major diameters of from 0.5 μm to 20 μm, and the number of the microscopic pits is from 25 to 3,000 per $mm^2$.

14 Claims, 2 Drawing Sheets

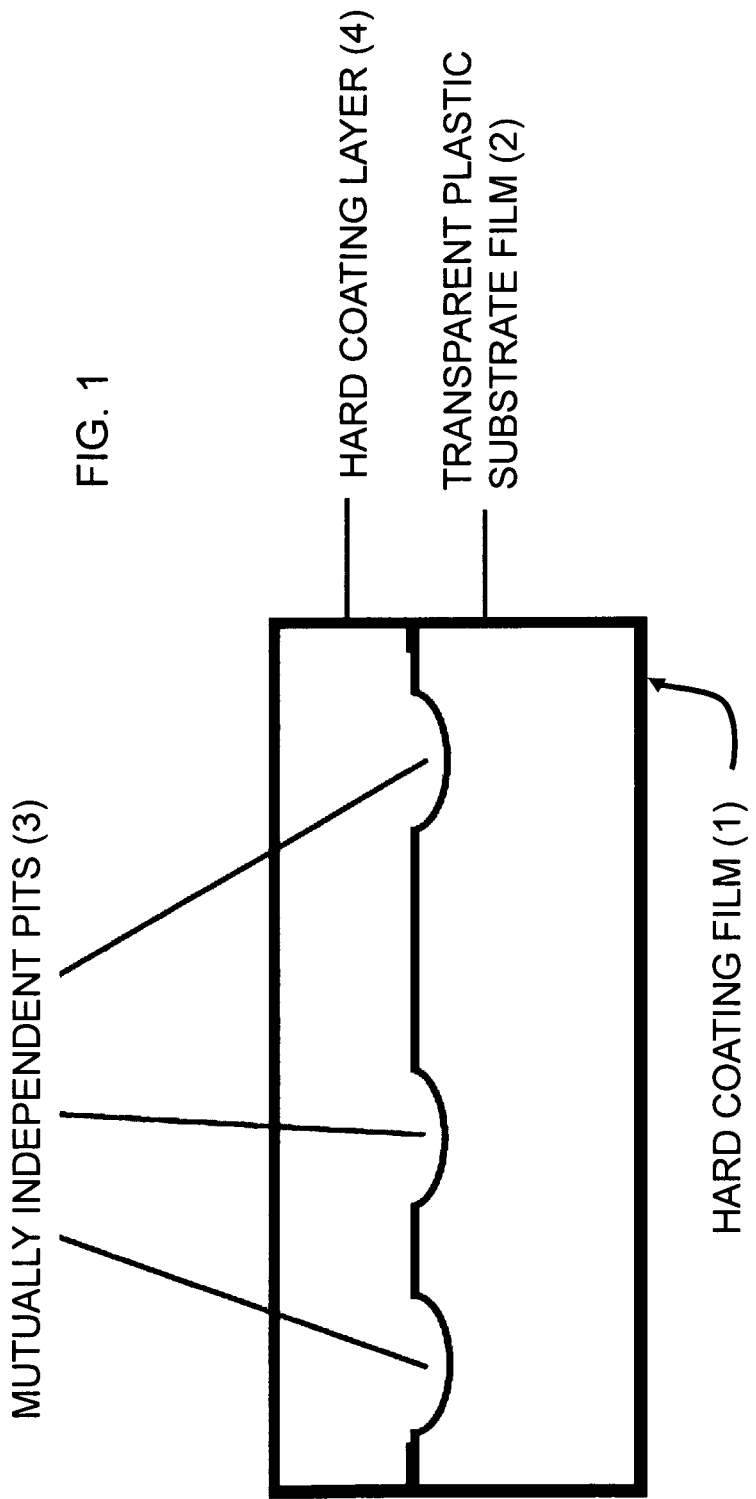

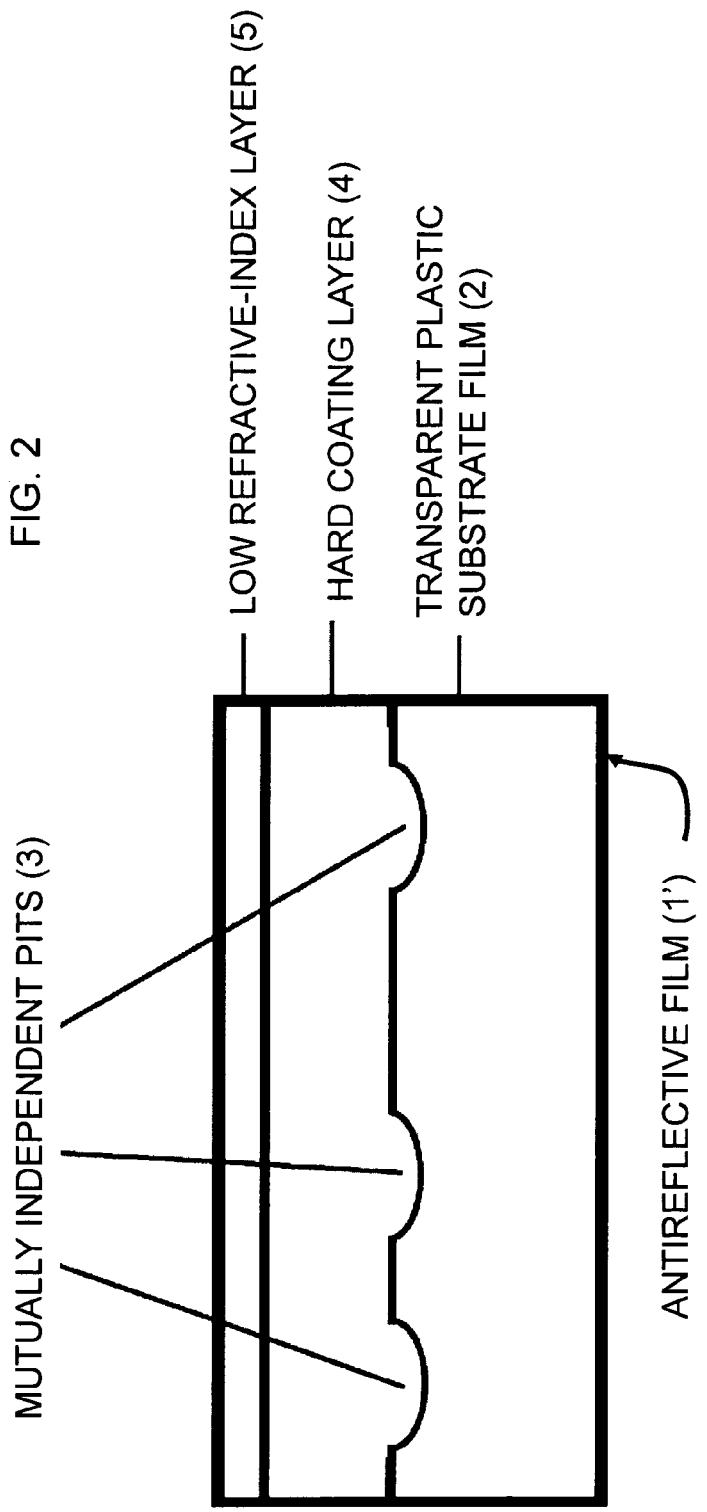

HARD COATING FILM, MANUFACTURING METHOD THEREOF, ANTIREFLECTIVE FILM, POLARIZING PLATE AND IMAGE DISPLAY UNIT

This application is based on and claims priority under 35 U.S.C. §119 from Japanese Patent Application No. 2009-229022, filed Sep. 30, 2009, the entire disclosure of which are herein incorporated by reference.

BACKGROUND OF THE INVENTION

1. Field of the Invention

The present invention relates to a hard coating film having a hard coating layer stacked on a transparent plastic substrate film which is free of internal haze and has microscopic pits formed in a specific shape with a specific frequency in the surface, thereby inhibiting occurrence of interference unevenness traceable to reflection between the hard coating film and the film substrate, and a manufacturing method thereof, and further to an antireflective film, a polarizing plate and an image display unit each having an antireflective layer stacked on such a hard coating film.

2. Background Art

An antireflective film is generally placed on the display surface in image display units various in their types, such as a liquid crystal display (LCD), a plasma display panel (PDP), an electroluminescent display (ELD) and a cathode-ray tube display (CRT), for the purpose of preventing a contrast drop from occurring by reflection of outside light from the display surface and surroundings' reflection in the image display unit. Therefore, the antireflective film is required to have not only high antireflection capabilities but also high transmittance and high physical strength (e.g. high resistance to scratching).

An antireflective layer for use in the antireflective film has so far been formed of a single-layer or multilayer thin film. In the case of a single-layer film, it is essential only that a layer having a lower refractive index than a substrate film (a low refractive-index layer) be formed in a thickness equal to a quarter of the design wavelength in optical-thickness terms. When further reduction in reflection is required, formation of a layer having a higher refractive index than a substrate film (a high refractive-index layer) between a substrate film and a low refractive index layer is known to be fine.

Such an antireflective film is suited for mass production and cost reduction, and therefore the antireflective film formation in a Roll-to-Roll mode utilizing a combined method of wet coating and UV cure has prevailed in recent years. With the growing demand for antireflective films formed through the use of such a wet coating method, it has been intensely desired to develop antireflective films which allow further reduction in costs and further improvement in functionality while keeping up low costs.

In the case of forming an antireflective film by using a transparent plastic film as a substrate film, a makeup that, after a hard coating layer having a thickness of the order of 1 to 20 μm is formed on the substrate film, an antireflective layer is formed thereon is widely adopted for the purpose of supplementing physical strength of the plastic film. Herein, when there is a difference in refractive index between the hard coating layer and the substrate film, reflection occurs at the interface between the hard coating layer and the substrate film, and causes interference with light reflected off the hard coating layer surface; as a result, interference unevenness develops (see JP-A-2005-14479 for the mechanism of occurrence of interference unevenness).

Another method for enhancing antireflection capabilities is also known in which two or more antireflective layers including a high reflective-index layer and a low reflective-index layer as mentioned above are stacked (see e.g. JP-A-11-153703). However, such a method involves an increase in number of layers and requires repeating the procedure including coating, drying and curing steps at least three times, and thereby a serious drop in productivity is caused. In addition, our study has revealed that the higher antireflection capabilities and the lower refractive index an antireflective film has, the more conspicuous the antireflective film for its interference unevenness.

As a method of increasing antireflection capabilities without increasing the number of antireflective layers in contrast to the above method, still another method is known in which, in a structure of having on a hard coating layer one low refractive-index layer as an antireflective layer, a high refractive index is imparted to the hard coating layer, and thereby the effect of interference between the hard coating layer and the low refractive-index layer is heightened to result in enhancement of antireflection effect (see e.g. JP-A-7-287102).

However, such a method has a problem that interference unevenness tends to become obtrusive because of a great difference in refractive index between the hard coating layer and a substrate film.

As a method for solving such a problem, there is a known method in which a solvent capable of penetrating into a substrate film is used in a coating composition for formation of a hard coating layer, thereby reducing interference unevenness (see e.g. JP-A-2007-84815). However, such a method introduces severe restrictions on usable solvents and substrate films, and besides, when the time for drying a hard coating layer is reduced with the intention of increasing productivity, effects of solvent's penetration into a substrate cannot be produced to a sufficient degree, which results in failure to bring about the effect of preventing interference unevenness. In addition, the method is difficult to control when there is a great difference in refractive index between the hard coating layer and the substrate film.

With the intention of solving those problems, JP-A-2004-345333 has advanced a proposal to provide an interference-unevenness prevention layer specific in refractive index and thickness between a substrate film and a hard coating layer. According to this proposal, neither solvent to be used for stacking a hard coating layer nor drying time is subjected to restrictions, and the prevention layer provided is effective even when there is a great difference in refractive index between the hard coating layer and the substrate film. In other words, the proposal can solve all the concerns. However, it involves the provision of a new layer, and has a problem in terms of productivity.

Based on a concept different from the above, the method of providing projections between a substrate and a hard coating layer and thereby preventing interference unevenness has also been suggested (see e.g. JP-A-2005-14479).

Antireflective films are broadly divided into two types, namely films of the type which utilize a method of scattering reflected light by providing asperities on the surfaces and thereby preventing outside images from being reflected therein (antiglare films), and films of the type which utilize a method of stacking antireflective layers without making any modification to the surface smoothness to lower their reflectivity, thereby preventing outside images from being reflected therein (clear-type antireflective films). Of these films, films developing interference unevenness traceable to differences in refractive index between their respective substrate films and hard coating layers are antireflective films of the type which have smooth surfaces. A reason for venturing to use clear-type antireflective films even though they tend to develop interference unevenness consists in that these films cause no scattering, and consequently the image display unit equipped with them is free of blurring of images (referred to as blurring of characters too).

Provision of projections between a substrate film and a hard coating layer causes scattering, a rise in haze and blurring of images resulting from the scattering. Thus it is undesirable to bring about elevations of haze in clear-type antireflective films.

In summary, it has been desired to develop hard coating films which each are free of interference unevenness caused by reflection from the interface between each individual transparent substrate film and hard coating layer, notably in cases where large differences in refractive index are present between individual substrate films and hard coating layers, ensure high productivity, have low haze and cause no blurring of images, antireflective hard coating films made by stacking antireflective layers on hard coating films having the foregoing features, transparent substrate films for use in hard coating films having the foregoing features, and manufacturing methods of those films.

SUMMARY OF THE INVENTION

According to the art of JP-A-2005-14479, formation of a new layer is required for the purpose of providing projections on the surface of a substrate film, and therefore the productivity problem cannot be solved. In addition, the art causes a problem that the projections provided scatter light and thereby there occurs a rise in haze. Moreover, our examination on the art has proved that, when a roll form of substrate film having projections on the surface is stored for a long time, there occurs a problem that the projections become flat by pressure and show deterioration in their effect of preventing interference unevenness.

Objects of the invention are therefore to provide a hard coating film which is suited for mass production and free of interference unevenness and blurring of images by a rise in haze even when there is a difference in refractive index between its substrate film and hard coating layer, notably in the case where the difference in refractive index is large, and to provide an antireflective film having an antireflective layer stacked on such a hard coating film. Further objects of the invention are to provide a polarizing plate and an image display unit which each are equipped with such a hard coating film or such an antireflective film. Still a further object of the invention is to provide a method of manufacturing such a hard coating film.

As a result of our intensive studies, it has been found that, by using as a substrate film of a hard coating film an internal haze-free transparent plastic film which has microscopic pits of specific shape with a specific frequency in the surface thereof, the interference unevenness problem of hard coating film can be solved with the productivity unchanged, and that without attended by a rise in haze, thereby achieving the invention.

A main feature of the invention is in having solved the previously outstanding problems by making it possible to manufacture a transparent plastic substrate film which is free of internal haze even through it has microscopic pits of specific shape with a specific frequency in the surface and by stacking a hard coating layer on the substrate film surface.

And the invention is based on a finding that, when a hard coating layer is stacked on a transparent plastic substrate film having microscopic pits of specific shape with a specific frequency in the surface through the use of a wet coating method or the like, the hard coating layer can have a flat surface, blurring of characters can be prevented, and light reflected from the interface between the hard coating layer and the substrate film can be scattered in moderate to result in inhibition of interference unevenness traceable to interface reflection.

Embodiments of the invention are as follows.

(1) A hard coating film comprising: a transparent plastic substrate film; and a hard coating layer,
wherein the transparent plastic substrate film has mutually independent microscopic pits in at least one surface thereof,
the microscopic pits each independently have a depth of 3 μm or below,
the microscopic pits have an average length of major diameters of from 0.5 μm to 20 μm, and
the number of the microscopic pits is from 25 to 3,000 per $mm^2$.

(2) The hard coating film as described in (1), wherein the transparent plastic substrate film has an internal haze of 5% or below.

(3) The hard coating film as described in (1) or (2), wherein the transparent plastic substrate film has an internal porosity of 10% or below in a region extending from a flat surface area on a side having the microscopic pits to a plane situated in a distance of 5 μm to 15 μm in a thickness direction of the transparent plastic substrate film.

(4) The hard coating film as described in any one of (1) to (3), wherein the microscopic pits in the surface of the transparent plastic substrate film are from 200 to 1,000 in number per square millimeter.

(5) The hard coating film as described in any one of (1) to (4), wherein the microscopic pits of the transparent plastic substrate film are from 1.0 μm to 8 μm in average length of the major diameters.

(6) The hard coating film as described in any one of (1) to (5), which has a surface having an arithmetic average roughness Ra of 0.04 μm or below.

(7) The hard coating film as described in any one of (1) to (6), wherein the transparent plastic substrate film is a film containing cellulose acylate polymer as a main constituent.

(8) The hard coating film as described in any one of (1) to (7), wherein the transparent plastic substrate film is a film obtained by: preparing a polymer solution through dissolution of a polymer composition in a mixed solvent containing at least two solvents that include a solvent having a dielectric constant of 35 or above and that are incompatible with each other; and forming the polymer solution into film.

(9) The hard coating film as described in (8), wherein the mixed solvent is a solvent containing the solvent having a dielectric constant of 35 or above in a proportion of 0.3 mass % to 30 mass %.

(10) The hard coating film as described in (8) or (9), wherein the mixed solvent is a solvent further containing a solvent having a dielectric constant of 2 to below 10 and a solvent having a dielectric constant of 10 to below 35.

(11) The hard coating film as described in any one of (8) to (10), wherein the solvent having a dielectric constant of 35 or above is water.

(12) The hard coating film as described in any one of (1) to (11), wherein a difference in refractive index between the hard coating layer and the transparent plastic substrate film is 0.02 or above.

(13) An antireflective film comprising: a hard coating film as described in any one of (1) to (12); and a low refractive-index layer which is lower in refractive index than the hard coating layer of the hard coating film, the low refractive-index layer being stacked on the hard coating layer directly or via another layer.

(14) A polarizing plate comprising: a polarizing film and protective films on both sides of the polarizing film, wherein at least one of the protective films is a hard coating film as described in any one of (1) to (12) or an antireflective film as described in (13).

(15) An image display unit comprising a hard coating film as described in any one of (1) to (12), an antireflective film as described in (13) or a polarizing plate as described in (14).

(16) A method of manufacturing a hard coating film, comprising:

preparing a transparent plastic substrate film by preparing a polymer solution through dissolution of a polymer composition in a mixed solvent containing at least two solvents that include a solvent having a dielectric constant of 35 or above and that are incompatible with each other, and by forming the polymer solution into film, and providing a hard coating layer on the transparent plastic substrate film prepared.

BRIEF DESCRIPTION OF THE DRAWINGS

FIG. 1 is a sectional view of a hard coating film of the present invention.

FIG. 2 is a sectional view of an antireflective film of the present invention.

DETAILED DESCRIPTION OF THE INVENTION

A present hard coating film 1, especially an antireflective film 1' having an antireflective layer stacked on the surface of the present hard coating film, is reduced in haze, has excellent antireflection capabilities, develops no interference unevenness, and excels in mass productivity.

In addition, the polarizing plate and the image display unit which each use the present hard coating film or antireflective film as a surface protection film have excellent optical properties and can ensure high-volume deliveries at low prices.

Exemplary embodiments are described below in detail with reference to FIGS. 1 and 2. Additionally, a range of numerical values expressed as "from A to B" in this specification is intended to include A as the lower limit and B as the upper limit. Further, the terms "a polarizing film" and "a polarizing plate" in this specification are used as distinguished from each other, and "a polarizing plate" is defined as a laminate having on at least one side of "a polarizing film" a transparent protective film for protection of the polarizing film. And tolerances on numerical values in the technical field to which the invention belongs, including the areas of polymer films, polarizing plates and image display units, will also apply to the numerical value ranges specified in this specification.

(Transparent Plastic Substrate Film)

The transparent plastic substrate film 2 used in the invention (simply referred to as the substrate film too) is a substrate film which is made up of a uniform composition and characterized by having in the surface thereof mutually independent microscopic pits which are 3 μm or below in their depth, from 0.5 μm to 20 μm in average length of their major diameters and from 25 to 3,000 per $mm^2$ in number thereof.

(Microscopic Pits)

Microscopic pits 3 of the substrate film for use in the invention are described below. The microscopic pits in the invention are from 0.5 μm to 20 μm in average length of their major diameters.

The wording "mutually independent" in the expression of "mutually independent microscopic pits" as used in the invention means that microscopic pits are present in isolation from one another in a substantial sense. The expression of "present in isolation" means that, in the case where microscopic pits are e.g. circular in shape when observed from the surface side of the substrate film 2, none of microscopic pits is present in a state of overlapping with its adjacent one, or in the shape like a Dharma doll. The expression of "in a substantial sense" means that 90% or more of microscopic pits are present in isolation from one another.

By adjusting the number of microscopic pits 3 to fall within the range specified above, mutually independent microscopic pits can be formed.

The average length of major diameters of microscopic pits 3 in the substrate film surface is from 0.5 μm to 20 μm, preferably from 1 μm to 10 μm, far preferably from 1 μm to 8 μm. When the microscopic pits are smaller than 0.5 μm in the average length of major diameters, they cannot have sufficient effect on prevention of interference unevenness; while, it is undesirable that the microscopic pits are greater than 20 μm in the average length of major diameters, because they cause a rise in haze.

Additionally, the term "a major diameter of each microscopic pit" as used in this specification refers to the longest diameter among diameters as straight line segments passing through the center of each microscopic pit 3 and terminating at the opening (the periphery). The major diameter of each microscopic pit can be determined by using an image-processing software program (e.g. Image Pro Plus), recognizing each of microscopic pits present in the face direction of film and measuring each microscopic pit for its longest diameter. And the average length of major diameters of microscopic pits refers to the average value of major diameters of microscopic pits present in one area of 1 $mm^2$ chosen arbitrarily from the film surface.

The microscopic pit 3 depth is 3 μm or below, and preferably from 0.5 μm to 3 μm in terms of high diffusion capability. The range far preferred as the depth is from 0.8 m to 2.8 μm, and the range particularly preferred is from 1.0 μm to 2.5 μm. The term microscopic pit depth refers to the average value of the depths of all the microscopic pits which are present in a sample film surface of a specified size and moreover have an average length of their major diameters in the range of 0.5 μm to 20 μm. When the microscopic pit depth is greater than 3 μm, there may be undesirable cases where such microscopic pits exert an influence on the surface of a hard coating layer provided thereon to make the leveling of the hard coating layer insufficient; as a result, the hard coating layer cannot have a smooth surface.

In addition, from the viewpoint of diffusion capability adjustment, the average spacing between adjacent twos among the microscopic pits is preferably from 1 μm to 500 μm, far preferably from 5 μm to 200 μm, particularly preferably from 10 μm to 100 μm. In this specification, the term the average spacing between adjacent twos among the microscopic pits refers to the value obtained by measuring a distance between the centers of each of the microscopic pits and the microscopic pit nearest thereto, summing the distances measured on all the microscopic pits and dividing the sum by the number of the microscopic pits.

Additionally, in this specification, the depth, average length of major diameters and average spacing of microscopic pits in the film surface refer to the values calculated from the surface profile measured with a surface profilometer. As the surface profilometer, an optical interference-based measuring instrument can be used, and a stylus-based measuring instrument can be used as well. As the optical interference-based measuring instrument, a three-dimensional non-contact surface profile measuring system (e.g. Micromap MM5000 Series, made by Ryoka Systems Inc.) can be used. And as the stylus-based measuring instrument, a stylus-based surface profilometer (e.g. Dektak 6M, made by ULVAC EQUIPMENT SALES, Inc.) can be used. By using such a surface profilometer, the distance between the film surface and the greatest depth of every microscopic pit can be automatically measured and calculated. These measurements are made on all the microscopic pits, and thereby the microscopic pit depth (namely, the average value of depths of all the microscopic pits) can be calculated.

As to the substrate film 2 for use in the invention, the number of the microscopic pits 3 in the film surface is from 25 to 30 per mm². Formation of at least 25 microscopic pits per mm² can produce the effect of preventing interference unevenness, and formation of at most 3,000 microscopic pits per mm² can inhibit the haze from rising after stacking of a hard coating layer. The number of microscopic pits is preferably from 100 to 1,000 per mm², far preferably from 200 to 1,000 per mm², particularly preferably from 200 to 800 mm².

From the viewpoint of achieving in-surface uniform inhibition of interference unevenness, the standard deviation of the microscopic pit number distribution in the surface of a substrate film for use in the invention is preferably within ±20% with respect to the average number of microscopic pits. And it is far preferred that the standard deviation of the microscopic pit number distribution in the film surface be within ±10%, especially within ±5%, with respect to the average number of the microscopic pits.

Herein, the average number can be determined by choosing randomly 100 spots of 1-mm² size from the film surface and calculating the average value of all the numbers of microscopic pits present in those spots, respectively.

From the viewpoint of preventing images from blurring while inhibiting interference unevenness, the standard deviation of the microscopic pit depth distribution in a substrate film for use in the invention is preferably ±20% or below with respect to the average depth. And it is far preferred that the standard deviation of the microscopic pit depth distribution in the film surface be ±10% or below, especially ±5% or below, with respect to the average depth. In addition, the number-average distribution of the microscopic pits is preferably monodisperse, and it is advantageous for the film to have microscopic pits distributed uniformly.

Herein, the average depth refers to the average value of depths of 100 microscopic pits chosen randomly.

The opening of each microscopic pit under observation from a direction perpendicular to the film surface may have any of shapes, including a circle, a polygon, an ellipse and figures formed with other curves. However, shapes close to a circle are preferred in point of high total transmittance. When the microscopic pits are circular in shape, circle-equivalent diameters (projected-area circle-equivalent diameter) ranging from 0.5 µm to 20 µm are preferred in point of diffusion capability adjustment, and those ranging from 1 µm to 10 µm, especially from 1 µm to 8 µm, are far preferred. Likewise, the bottom of each microscopic pit under observation from a direction perpendicular to the film surface, though may have any of shapes, including a circle, a polygon, an ellipse and figures formed with other curves, preferably has a shape close to a circle in point of high total transmittance.

Further, it is appropriate from the viewpoint of contributing to high total transmittance that the ratio between the average lengths of major diameters and minor diameters of the microscopic pits (aspect ratio) be from 0.8 to 1.2, preferably from 0.85 to 1.15, particularly preferably from 0.9 to 1.1.

<Profile Shape of Microscopic Pit>

Preferred profile shapes of the microscopic pits 3 are described below. Additionally, the term profile shape as used herein represents a shape in the profile section obtained when the film is place on a flat plane and cut perpendicularly to the thickness direction.

The microscopic pits 3 have no particular restrictions as to their profile shapes, except that their deepest points are 3 µm or below in depth and the average length of major diameters at the openings thereof is in a range from 0.5 µm to 20 µm. However, each profile shape is preferably downward convexity, and formed of a bottom parallel in the main to the film surface and a side part with which the bottom and opening of each microscopic pit are connected. As a typical example of such a shape, a cup-like shape is suitable. The wording of a cup-like shape means the shape which resemble the shape of a coffee cup or a tea cup and has a bottom which is mainly parallel to the film surface and contributes at least 25% of the microscopic pit width and a side part (both sides) of each microscopic pit 3 which describes a gentle curve directing from the bottom to the opening and forms a plane nearly perpendicular to the film surface in the opening at the periphery. In such a sense, a crater-like shape and a cycloidal shape are also included in the cup-like shapes.

Although a sphere and a square are thought of as profile shapes of microscopic pits, the spherical profile shape is high in curvature, and therefore tends to rather cause an increase in haze.

Profile shapes having such characteristics can be formed by preparing films in accordance with the present manufacturing method described hereinafter, and cannot be formed by usual embossing and incorporation of fine particles in a dispersed state. By the way, though pits can be formed in a film surface by e.g. grinding the surface with sandpaper or applying fine particles (sand or silica particles) to the surface, the pits formed have almost random shapes, which are outside the scope specified above as the shapes of microscopic pits the present film has, and therefore cause a rise in haze when production of sufficient effect on prevention of interference unevenness by use of them is intended.

When stacking of a hard coating layer 4 is carried out, the substrate film prepared according to the invention can reduce interference unevenness to a greater degree than a case where pits are formed in a substrate film through modification of the film surface profile by embossing or by application of heat or pressure. The surface profile shape of the substrate film according to the invention is attributed to spontaneous structure formation, and therefore has a feature that residual stress in the vicinity of the film surface is small. Thus, the film surface has an advantage in that asperities thereon are small in dimensional change rates including coefficients of thermal expansion and hydroscopic expansion, and this advantage manifest itself noticeably under a heat-applied condition, especially in films formed mainly from relatively hydrophilic cellulose polymers, notably cellulose acylate polymers.

It is preferable that the surface of the substrate film for use in the invention is flat in the area other than microscopic pits (that is, the substrate film surface has a flat area).

<Other Characteristics>

The haze of a substrate film for use in the invention is preferably 20% or below, far preferably 15% or below. And the internal haze is preferably 5% or below, far preferably 3% or below, further preferably 2% or below.

By making no pores in the interior of a substrate at the time of forming microscopic pits in the surface of the substrate, increases in total haze and internal haze can be suppressed. Substrate films satisfying these requirements can be prepared by use of the manufacturing method described hereinafter.

In addition, the number and size of microscopic pits become causes of a rise in haze, but the rise in haze can be suppressed by adjusting the average length of major diameters, depth and number of microscopic pits to fall within the ranges specified above.

Additionally, the haze can be measured with a haze meter (NDH2000, made by NIPPON DENSHOKU INDUSTRIES, CO., LTD.). And the internal haze can be determined by inserting a film between a pair of glass plates having a gap adjusted to 1 mm, injecting oil with a haze equivalent to that of the film into the gap, and then making haze measurement.

The total transmittance of a substrate film for use in the invention is preferably 70% or above, far preferably from 80% to 99%, particularly preferably from 85% to 98%.

It is important for adjusting the total transmittance to fall within the foregoing range that no pores be made in the interior of the substrate at the time of forming microscopic pits in the substrate surface.

<Composition>

The substrate film for use in the invention is made up of a uniform composition. In other words, reduction in a haze which develops inside the substrate film becomes possible by allowing the film to have a uniform composition, and microscopic pits can therefore be formed in the film surface as the internal haze is suppressed. In addition, even when film cuttings produced in the course of manufacturing are collected and mixed into a raw material, degradation of quality does not occur so long as the substrate film has a uniform composition, and therefore cost reduction becomes possible. Herein, the term uniform composition means that a substance of the size leading to scattering of light, such as particles, is not contained in a substantial sense in the composition. And the wording of "not contained in a substantial sense" indicates that the haze arising from an extraneous substance of the size leading to scattering of light contributes below 5% of the total haze.

In the invention, the microscopic pits in the substrate film are also made up of the uniform composition, and thereby the total transmittance can be raised and cost reduction is made possible.

A substrate film for use in the invention is made up of a polymer composition. Although the substrate film has no limitation to polymers used therein, it is advantageous for the polymers to be chosen from polymers highly pervious to visible light. When the substrate film is manufactured in accordance with the present method described hereinafter, it is preferred that the polymers used therein be chosen from polymer materials allowing film formation from their solutions. Examples of a polymer material usable in such a case include cellulose acylate, polycarbonate, polyvinyl alcohol, polyimide, polyolefin, polyarylate, polyester, polystyrene, styrene copolymers, polymethyl methacrylate, methyl methacrylate copolymers and polyvinylidene chloride, but the polymers usable therein are not limited to these examples. In view of the fact that a polarizing film to be stacked is usually a polyvinyl alcohol film, it is preferable that the polymer composition contains as a main polymer cellulose acylate or polyvinyl alcohol which has an affinity for and adhesion to polyvinyl alcohol film, particularly cellulose acylate in point of ageing stability. Herein, when the film is formed from a single polymer, the term main polymer refers to the polymer itself; while, when the film is formed from a plurality of polymers, the term refers to a polymer highest in mass fraction among the constituent polymers.

Further, the cellulose acylate usable in the substrate film is described. Examples of cellulose as a raw material of cellulose acylate film include cotton linter, kenaf and wood pulp (including hardwood pulp and soft wood pulp). Any of cellulose esters obtained from such raw material cellulose can be used, and mixtures thereof may be used.

Cellulose acylate is an ester of cellulose and a carboxylic acid. In the cellulose acylate, acyl groups are substituted for all or part of the hydrogen atoms of the hydroxyl groups situated at the 2-, 3- and 6-positions of each of glucose units constituting the cellulose. The number of carbon atoms in each acyl group is preferably from 2 to 22, far preferably from 2 to 4. Examples of such an acyl group include an acetyl group, a propionyl group, a butyryl group, an isobutyryl group, a pivaroyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, a cyclohexanecarbonyl group, a oleoyl group, a benzoyl group, a naphthylcarbonyl group and cinnamoyl group. Of these groups, an acetyl group, a propionyl group, a butyryl group, a dodecanoyl group, an octadecanoyl group, a pivaroyl group, an oleoyl group, a benzoyl group, a naphthylcarbonyl group and a cinnamoyl group are preferable to the others, and the best ones among them are an acetyl group, a propionyl group and a cinnamoyl group.

Alternatively, cellulose acylate may be an ester of cellulose and two or more kinds of carboxylic acids. In other words, cellulose acylate may be substituted with two or more kinds of acyl groups.

As to the cellulose acylate, when the degree of acetyl (carbon number: 2) substitution for hydroxyl groups of the cellulose is symbolized by SA and the degree of acyl (carbon number: 3 or more) substitution for hydroxyl groups of the cellulose is symbolized by SB, SA and SB adjustments allow haze control of the cellulose acylate film prepared through the use of the present manufacturing method.

Based on the haze required of the cellulose acylate film prepared as a substrate film for use in the invention through the use of the present manufacturing method, SA+SB are adjusted as appropriate. More specifically, SA+SB is adjusted to satisfy preferably $2.70 < SA+SB \leq 3.00$, far preferably $2.80 \leq SA+SB \leq 3.00$, further preferably $2.85 \leq SA+SB \leq 2.98$. Increasing the value of SA+SB tends to cause a rise in haze.

In addition, haze control of the cellulose acylate film prepared by the present manufacturing method can also be attained by SB adjustment. When the value of SB is increased, the film formed tends to have an increased haze, and at the same time, its elasticity coefficient and melting temperature are lowered. In view of the balance between the haze and other physical properties of the film, the range of SB is preferably $0 \leq SB \leq 2.9$, far preferably $0.5 \leq SB \leq 2.5$, further preferably $1 \leq SB \leq 2.0$. By the way, when all the hydroxyl groups in cellulose undergo substitution, the substitution degree SA+SB is 3.

Synthesis methods of cellulose acylate are described in detail in *JIII Journal of Technical Disclosure* No. 2001-1745, pp. 7-12 (published by Japan Institute of Invention and Innovation in Mar. 15, 2001), and for syntheses in the invention this journal can be referred to.

In addition to one or more than one kind of polymer as a main ingredient, the substrate film for use in the invention may contain additives. Examples of usable additives include a plasticizer (added preferably in an amount of 0.01 mass % to 20 mass % based on the polymer used), a ultraviolet absorbent (0.001 mass % to 1 mass % on the same basis as above), a fluorine-containing surfactant (0.001 mass % to 1 mass % on the same basis as above), a parting agent (0.0001 mass % to 1 mass % on the same basis as above), a degradation inhibitor (0.0001 mass % to 1 mass % on the same basis as above), an optical isomerism control agent (0.01 mass % to 10 mass % on the same basis as above) and an infrared absorbent (0.001 mass % to 1 mass % on the same basis as above). To the substrate film, a dispersion of particles of an organic material, an inorganic material or a mixture thereof may further be added in a minute amount so long as it does not impair effects of the invention. These particles are added for the purpose of improving the transport capability of film at the time of film formation. For attaining this purpose and not impairing effects of the invention, it is appropriate to adjust the size of particles in the dispersion to fall within a range of 5 nm to 3,000 nm, the difference in refractive index between the particles and the substrate film to fall within a range of 0 to 0.5 and the amount of the particles added to fall below 1 mass %. Examples of particles of an inorganic material include silicon oxide particles, aluminum oxide particles and barium sulfate particles. And examples of an organic material to be dispersed in the form of particles include acrylic resins, divinylbenzene resins, benzoguanamine resins, styrene resins, melamine resins, acrylic-styrene resins, polycarbonate resins, polyethylene resins and polyvinyl chloride resins.

(Method of Manufacturing Transparent Plastic Substrate Film)

An example of a method of manufacturing transparent plastic substrate films for use in the invention is as follows. According to the following method, substrate films usable in the invention can be easily manufactured without requiring complicated operations, special systems and so on.

First a solution of polymer composition is prepared. The polymer concentration in the solution is preferably from 5 mass % to 40 mass %, far preferably from 10 mass % to 25 mass %, further preferably from 10 mass % to 15 mass %. It is advantageous for the polymer concentration to fall within the preferred range from the viewpoints of enhancing the film formation capability and reducing streaking troubles occurring on the film surface during long running.

The invention is characterized in that a mixed solvent containing at least two kinds of solvents which include a solvent having a dielectric constant of 35 or above and are incompatible with each other is used as the solvent in preparing the polymer solution, and thereby manufacturing of films whose surface profiles are appropriately controlled is made possible. By contrast, a polymer solution is usually prepared by using solvents compatible with each other, and in many cases the film formed has therefore no pits in the surface, and besides, pores are made in the interior of the film. Thus, such a film suffers a rise in internal haze, and cannot ensure compatibility between suppression of a rise in haze value and prevention of interference unevenness. In the invention, a film having microscopic pits having the shape specified by the invention in its surface can be formed by undergoing a process step of preparing a polymer solution by dissolving a polymer composition in a mixed solvent containing at least two solvents which are incompatible with each other and include a solvent having a dielectric constant of 35 or above and a process step of making the polymer solution into film. Additionally, the substrate film for use in the invention has a further feature that it has a low internal porosity in the vicinity of its microscopic pits, and more specifically, the internal porosity in a region extending from the flat surface area on the side having the microscopic pits to a plane situated in a distance of 5 µm to 15 µm in the thickness direction is preferably 10% or below (by volume), far preferably 5% or below, further preferably 3% or below, particularly preferably 2% or below. The internal porosity in a region extending from the flat surface area on the side having the microscopic pits to a plane situated in a distance of 5 µm to 15 µm in the thickness direction can be calculated, on the basis of cross-section observations under SEM (scanning electron microscope), from a ratio of the pore area to the total cross-sectional area of the region extending from the flat surface area on the side having the microscopic pits to a plane situated in a distance of 5 µm to 15 µm in the thickness direction.

In the vicinity of microscopic pits, the internal porosity exceeding 10% is undesirable because it causes not only internal haze but also reduction in pencil hardness after stacking of a hard coating layer.

A reason for the reduction in internal porosity by the use of a high-dielectric constant solvent in the invention can be thought as follows. Internal pores are formed in a process that fine droplets are formed at the time of film formation and the solvent therein dries out finally. Solvents 35 or above in dielectric constant, notably water, are poor in compatibility with polymers (especially cellulose acylate), and are excluded from a system in the process of drying. Therefore fine droplets resist forming inside the system and concentrate on the film surface as a border with the outside of the system. On the other hand, a decrease in dielectric constant of solvents used leads to an increase in compatibility with cellulose acylate, and thereby droplets are easy to form inside a system, resulting in easy formation of internal pores.

<Solvent>

In the invention, it is appropriate to use a mixed solvent containing a solvent with a dielectric constant of 35 or above (hereinafter referred to as "a high-dielectric constant solvent") in a proportion of 0.3 mass % or above, and thereby a surface profile of the film can be controlled more appropriately. The use of a mixed solvent containing a high-dielectric constant solvent in a proportion of 0.5 mass % or above is preferable, and the use of a mixed solvent containing a high-dielectric constant solvent in a proportion of 1.0 mass % or more is far preferable in a point of stability. On the other hand, when the proportion of a high-dielectric constant solvent is too high, polymers resist being dissolved in a resulting mixed solution, and a polymer solution becomes difficult to prepare, or even when a polymer solution is prepared, only a dope high in haze can be obtained and there may occur deterioration in ageing stability of the dope or an increase of foreign particles in the film formed. From such a point of view, the proportion of a high-dielectric constant solvent is preferably 30 mass % or below, far preferably 10 mass % or below, further preferably 5 mass % or below. By forming a film from a polymer solution prepared using solvents including a high-dielectric constant solvent within the specified range, phase separation of the polymer and the high-dielectric constant solvent is thought to occur upon vaporization of the solvents during or after the film formation. As a result, it becomes easier to form in the film surface such microscopic pits as the substrate film in the invention has. From the viewpoint of more effectively forming microscopic pits in the film surface, the boiling temperature of a high-dielectric constant solvent is preferably higher, far preferably at least 5° C. higher, further preferably at least 10° C. higher, than that of a low boiling solvent as described below, and it is preferable that these solvents form no azeotropic mixture.

In a method of manufacturing substrate films for use in the invention, it is preferable that the following relation (I) holds between a dope (polymer solution) haze ($\tau 0$) and a dried film haze ($\tau 1$). Because the haze of a polymer solution in particular is a parameter in correlation with the dope solubility, as long as the dope haze is within the range as specified below, it becomes possible to attain sufficient ageing stability of the dope and to reduce foreign particles remaining after film formation.

$$\tau 0 < \tau 1 \qquad (I)$$

The polymer solution haze TO is preferably of the order of 0.2% to 50%, far preferably from 0.2% to 30%, further preferably from 0.3% to 10%.

Herein, the dielectric constant of a solvent is explained. The dielectric constant is defined as c in an equation representing the relation between an electric flux density D and an electric field E, namely $D=\in E$, and $\in$ is a parameter having a correlation with the susceptibility of solvent molecules to polarization. The dielectric constant values of solvents are listed e.g. as "relative dielectric constant values" in *Kagaku Binran Kiso-Hen I* (Handbook of Chemistry, Pure Chemistry), 5th Ed., pp. 1-770, compiled by The Chemical Society of Japan.

Examples of a high-dielectric constant solvent include water (dielectric constant: 78), glycerin (dielectric constant: 43), ethylene glycol (dielectric constant: 37), dimethylformamide (dielectric constant: 37), acetonitrile (dielectric constant: 38), dimethyl sulfoxide (dielectric constant: 49), formic acid (dielectric constant: 58) and formamide (dielectric constant: 110). Of these solvent, water is preferable to the others in terms of handling suitability including ease of drying and safety in the process of film formation. The boiling temperature of a high-dielectric constant solvent is preferably from 70° C. to 300° C., far preferably from 80° C. to 250° C., especially preferably from 90° C. to 210° C., from the viewpoint of surface profile control at the time of film formation.

Besides using a high-dielectric constant solvent, it is appropriate to use at least one organic solvent as a good solvent for polymers as a main solvent. Although the main solvent has no particular restriction as to its kind, it is preferable that the main solvent has no compatibility with the high-dielectric constant solvent used. In the case of not using any solvent other than the high-dielectric constant solvent and the main solvent for polymers, it is necessary for the main solvent to be a solvent incompatible with the high-dielectric constant solvent. From the viewpoint of reducing a drying load, it is far preferred that the main solvent be an organic solvent having a boiling temperature of 80° C. or below (a low boiling solvent). The boiling temperature of the main solvent is further preferably from 10° C. to 80° C., particularly preferably from 20° C. to 60° C. In some cases, organic solvents having their boiling temperatures in a range of 30° C. to 45° C. can also be used suitably as the main solvents. As especially suitable examples of such main solvents, halogenated hydrocarbons can be given, and in some cases, ester, ketone, ether, alcohol and hydrocarbon can also be cited. These solvents may have a branched structure or a cyclic structure. In addition, each of the main solvents as recited above may have any two or more functional groups chosen from among the functional groups of ester, ketone, ether and alcohol (namely, —O—, —CO—, —COO— and —OH). Further, hydrogen atoms in the hydrocarbon moiety of ester, ketone, ether or alcohol may be substituted with halogen atoms (notably fluorine atoms). Additionally, when the polymer solution used in the present manufacturing method includes only one kind of solvent, the main solvent refers to the solvent itself, and when the polymer solution includes two or more kinds of solvents, the main solvent refers to the solvent highest in mass fraction among the constituent solvents.

As examples of an organic solvent used in combination with the main solvent in addition to the high-dielectric constant solvent, halogenated hydrocarbon, ester, ketone, ether, alcohol and hydrocarbon can be given. These organic solvents may have a branched structure or a cyclic structure. In addition, each of the organic solvents recited above may have any two or more functional groups chosen from among the functional groups of ester, ketone, ether and alcohol (namely, —O—, —CO—, —COO— and —OH). Further, hydrogen atoms in the hydrocarbon moiety of ester, ketone, ether or alcohol may be substituted with halogen atoms (notably fluorine atoms). Additionally, when the main solvent for polymers is a solvent compatible with the high-dielectric constant solvent, it is necessary for the organic solvent used in combination with the main solvent in the invention to be a solvent incompatible with the high-dielectric constant solvent.

As the halogenated hydrocarbon, chlorinated hydrocarbon such as dichloromethane or chloroform is preferable, and dichloromethane is far preferable.

Examples of the ester include methyl formate, ethyl formate, propyl formate, pentyl formate, methyl acetate, ethyl acetate and pentyl acetate.

Examples of the ketone include acetone, methyl ethyl ketone, diethyl ketone, diisobutyl ketone, cyclopentanone, cyclohexanone and methylcyclohexanone.

Examples of the ether include diethyl ether, methyl tert-butyl ether, diisopropyl ether, dimethoxymethane, dimethoxyethane, 1,4-dioxane, 1,3-dioxolane, 4-methyl-dioxolane, tetrahydrofuran, methyltetrahydrofuran, anisole and phenetole.

Examples of the alcohol include methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol and 2,2,3,3-tetrafluoro-1-propanol, Examples of the hydrocarbon include n-pentane, cyclohexane, n-hexane, benzene and toluene.

When the polymer as a main ingredient is cellulose acylate, the combined use of the high-dielectric constant solvent and a solvent prepared by mixing a solvent having a dielectric constant of 10 to below 35 (also referred to as "a medium-dielectric constant solvent" in this specification) and a solvent having a dielectric constant of 2 to below 10 (also referred to as "a low-dielectric constant solvent" in this specification) which are chosen from the solvents recited above is advantageous because a highly transparent polymer solution can be prepared with stability. More specifically, though the use of the high-dielectric constant solvent is preferable from the viewpoint of surface profile control and the use of the low-dielectric constant solvent is preferable from the viewpoint of polymer solubility enhancement, these solvents are poor in compatibility and degrade stability of the dope prepared. Thus, the use of a medium-dielectric constant solvent in combination with those solvents allows enhancement of solvent compatibility and expansion of the range of compatibility between the surface profile control in film formation and the dope stability.

In the mixed solvent, the proportion of the medium-dielectric constant solvent included is preferably from 0.3 mass % to 30 mass %, far preferably from 1 mass % to 15 mass %, further preferably from 2 mass % to 10 mass %.

In the mixed solvent, the proportion of the low-dielectric constant solvent included is preferably from 40 mass % to 99.5 mass %, far preferably from 60 mass % to 99 mass %, particularly preferably from 70 mass % to 98 mass %.

Examples of the medium-dielectric constant solvent include alcohols, ketones and ethers, and more specifically, they include acetone (dielectric constant: 21), methyl ethyl ketone (dielectric constant: 19), diethyl ketone (dielectric constant: 14), diisobutyl ketone (dielectric constant: 15), cyclopentanone (dielectric constant: 19), cyclohexanone (dielectric constant: 18), methylcyclohexanone (dielectric constant: 18), ethyl 2-ethoxyacetate (dielectric constant: 11), 2-methoxyethanol (dielectric constant: 30), 1,2-diacetoxyacetone (dielectric constant: 16), acetyl acetone (dielectric constant: 17), ethyl acetoacetate (dielectric constant: 16), methanol (dielectric constant: 33), ethanol (dielectric constant: 24), 1-propanol (dielectric constant: 22), 2-propanol (dielectric constant: 22), 1-butanol (dielectric constant: 17), 2-butanol (dielectric constant: 16), tert-butanol (dielectric constant: 11), 1-pentanone (dielectric constant 14), 2-methyl-2-butanol (dielectric constant: 13) and cyclohexanol (dielectric constant: 15).

Examples of the low-dielectric constant solvent include the halogenated hydrocarbons and esters, and more specifically, they include dichloromethane (dielectric constant: 9), dimethoxyethane (dielectric constant: 6), 1,4-dioxane (dielectric constant 2), 1,3-dioxolan (dielectric constant: 3), 1,3,5-trioxane (dielectric constant: 3), tetrahydrofuran (dielectric constant: 8), anisole (dielectric constant: 4), phenetole (dielectric constant: 4), ethyl formate (dielectric constant: 9), n-propyl formate (dielectric constant: 6), n-pentyl formate (dielectric constant: 6), methyl acetate (dielectric constant: 7), ethyl acetate (dielectric constant: 6), n-pentyl acetate (dielectric constant: 5), and 2-butoxyethanol (dielectric constant: 9).

Of these solvents, a mixed solvent of water, at least one kind of alcohol and at least one kind of halogenated hydrocarbon is preferable to the others, and a mixed solvent containing water in a proportion of 0.3 to 30 mass %, at least one kind of alcohol in a proportion of 1 to 30 mass % and at least one kind of halogenated hydrocarbon in a proportion of 60 to 99 mass % is far preferred. Above all, a mixed solvent of water (dielectric constant: 78), methanol (dielectric constant: 33) and dichloromethane (dielectric constant: 9) is used to advantage. From the viewpoint of consistency in content, it is preferred that the water content in such a mixed solvent be at least 0.5 mass %. Further considering film-forming properties such as polymer solubility and viscoelasticity of a polymer solution, the water content is preferably from 0.5 mass % to 10 mass %, far preferably from 1 mass % to 5 mass %. On the other hand, the alcohol content is preferably from 3 mass % to 20 mass %, far preferably from 5 mass % to 10 mass %, in consideration of film-forming properties including polymer solubility and reduction in streaking troubles occurring on the surface of film formed during long running. And the total proportion of solvents other than the main solvent, or the proportion of such a water-alcohol combination, is preferably from 0.8 mass % to 40 mass %, far preferably from 2 to 35 mass %.

Preparation of a polymer solution can be carried out by using a dope preparation method and apparatus in the usual solvent cast process. One example thereof is a method including a step (swelling step) in which, while swelling a polymer and additives added as required in a solvent at a low temperature, dissolution of them into the solvent is pursued and a step (dissolving step) in which the polymers and others are completely dissolved in the solvent under applied heat and pressure.

In the swelling step, the solvent temperature is kept at a low temperature on the order of −10° C. to 39° C. At the time of the swelling step, it is appropriate to perform stirring and pursue dissolution of a portion or all portions of the polymer and so on in the solvent. In general the swelling step is preferably carried on for a time on the order of 0.1 to 6 hours.

In the next dissolving step, it is appropriate that the solvent temperature is raised up to about 40° C. to about 240° C. by heating, and at the same time pressure of the order of 0.2 to 30 MPa is applied to the solvent. However, the heat and pressure to be applied should not be construed as being limited to the ranges specified above, and they may be chosen as appropriate according to the kinds of solute and solvent. The dissolving step is preferably carried on for a time of the order of 0.1 to 6 hours.

Then, the polymer solution prepared is formed into film. Film formation can be carried out according to a general solvent casting method. More specifically, film formation is performed by subjecting the polymer solution prepared to casting onto a drum or a band, and further by vaporizing the solvent from the polymer solution cast. Herein, it is preferred that mirror finish be given in advance to the surface of the drum or band. Dopes based on the present manufacturing method may be cast in a single layer or they may be cast in multiple layers. In the case of casting dopes in multiple layers, the method generally used in manufacturing of multilayer sheet/film can be adopted. For example, a feed block method which allows easy control of the number of layers or a multimanifold method superior in thickness accuracy of multiple layers can be used. In the invention, the feed block method is preferably used. When the film forming method is simultaneous or sequential co-casting of multiple layers, especially three or more layers, it is preferable from the viewpoint of haze elevation that the dope based on the present manufacturing method is used for forming a surface layer or a layer next to the surface layer. When the dope base on the present manufacturing method is used for forming the layer next to the surface layer, the thickness of the surface layer is preferably not greater than 10 μm or 10% of the total thickness of the film if this is smaller than 10 μm, far preferably not greater than 5 μm or 5%, further preferably not greater than 3 μm or 3%. Such thickness adjustment is profitable because geisser pollution with the passage of time is reduced in some cases. Further, in point of the ability to peel off the drum or band, it is preferable that the dope based on the present manufacturing method is used for a layer which is not in direct contact with a support.

Casting and drying operations in the solvent casting method can be performed according to the descriptions found e.g. in JP-A-58-127737, JP-A-61-106628, JP-A-2-276830, JP-A-4-259511, JP-A-5-163301, JP-A-9-95544, JP-A-10-45950, JP-A-10-95854, JP-A-11-71463, JP-A-11-302388, JP-A-11-322946, JP-A-11-322947, JP-A-11-323017, JP-A-2000-53784, JP-A-2000-273184, JP-A-2000-273239, U.S. Pat. No. 2,336,310, U.S. Pat. No. 2,367,603, U.S. Pat. No. 2,492,078, U.S. Pat. No. 2,492,977, U.S. Pat. No. 2,492,978, U.S. Pat. No. 2,607,704, U.S. Pat. No. 2,739,069, U.S. Pat. No. 2,739,070, GB Patent No. 640731, GB Patent No. 736892, JP-B-45-4554, JP-B-49-5614, JP-A-60-176834, JP-A-60-203430 and JP-A-62-115035.

It is preferred that the dope be cast onto a support, such as a drum or a band, the surface temperature of which is adjusted to 10° C. or below.

In the present method, it is preferred that the polymer solution is formed into film on a support, then peeled away from the support, and further dried. At the step of drying, the residual solvent in the film is vaporized. The drying can be performed by blowing dry air in the film surface. The drying may also be carried out in a step-by-step manner while raising stepwise the temperature of dry air. Details of casting and drying steps in the film formation method by solution casting are described in JP-A-2005-104148, pp. 120-146, and they can be also applied to the invention as appropriate.

The polymer film thus formed can be utilized as the substrate film in the invention as it is. In addition, the film formed may be subjected to drawing treatment if desired, and thereby haze adjustment may be made. As to drawing conditions, there are no particular restrictions. The drawing can be performed under usual conditions, e.g., conditions that the drawing temperature is of the order of (Tg−20)° C. to (Tg+50)° C. and the draw ratio is of the order of 20% to 40%.

The drawing can be carried out by means of a roll drawing machine. And the film may undergo longitudinal or lateral uniaxial drawing treatment, or it may undergo biaxial drawing treatment. In general, however, longitudinal uniaxial drawing treatment, namely the treatment of drawing long lengths of film in the direction of the length, is carried out.

The substrate film 2 for use in the invention has no particular restriction as to its thickness, but the thickness is generally of the order of 20 to 200 μm, preferably of the order of 20 to 100 μm in terms of reduction in thickness.

(Hard Coating Layer)

The term hard coating film as used in the invention refers to a film having a surface hardness of H or higher as determined by the pencil hardness testing described hereinafter, and the term hard coating layer refers to a layer for attainment of such a pencil hardness. By providing a hard coating layer 4, it is advantageous for the hard coating film 1 to have a pencil hardness of 2H or higher, preferably 3H or higher, particularly preferably 4H or higher, on the hard coating layer's side.

It is preferred that the hard coating layer 4 in the invention be formed so as to impart an arithmetic average roughness Ra of 0.04 μm or below, preferably 0.03 μm or below, far preferably 0.02 μm or below, to the surface of the resulting hard coating film. Such surface roughness adjustment is advisable because the hard coating film causes no blurring of characters when mounted on an image display unit.

Further, it is preferable that the hard coating layer 4 in the invention is formed so that a difference in refractive index between the hard coating layer and the substrate film is at least 0.02 or above, preferably from 0.02 to 0.10. Such a refractive index control is advisable, because it allows easy reduction in reflectivity of an antireflective film having a low refractive-index layer on the top surface.

The hard coating layer 4 according to the invention may be formed with any method, but in point of productivity, it is preferable to form the hard coating layer by coating a curable composition which is cured by irradiation with active energy beams, and the hard coating layer 4 is preferably a layer including a curable resin which is cured by irradiation with active energy beams.

The refractive index of a resin usable for forming the hard coating layer 4 is preferably from 1.45 to 1.60, far preferably from 1.50 to 1.55

As a curable resin which is cured by irradiation with active energy beams, a curable resin having at least two acryl groups per molecule is suitable. Examples of such a curable resin include polyol polyacrylates such as ethylene glycol diacrylate, 1,6-hexanediol diacrylate, bisphenol A diacrylate, trimethylolpropane triacrylate, ditrimethylolpropane tetraacrylate, pentaerythritol triacrylate, pentaerythritol tetraacrylate, dipentaerythritol pentaacrylate and dipentaerythritol hexaacrylate, and polyfunctional epoxy acrylates obtained by reaction between polyisocyanate curable resins and hydroxyl-containing acrylates such as hydroxyethyl acrylate. Further, polymers having ethylenically unsaturated groups in their side chains can also be used.

For curing of the hard coating layer in the invention, radiation, γ rays, α rays, electron beams, ultraviolet rays or the like can be used as active energy beams. A method of adding a polymerization initiator which can produce radicals upon irradiation with ultraviolet rays and performing curing by use of ultraviolet rays is used to particular advantage.

As to the polymerization initiator, one kind of polymerization initiator may be used, or a combination of two or more kinds of polymerization initiators may be used. The amount of a polymerization initiator added is preferably from 0.1 mass % to 15 mass %, far preferably from 1 mass % to 10 mass %, with respect to the total mass of the ethylenically unsaturated group-containing curable resin and the ring-opening polymerizable group-containing curable resin contained in a curable composition.

There is also a case where the hard coating layer 4 is formed with a material high in refractive index.

For instance, a method of charging an inorganic particulate filler, such as alumina, titanium oxide or zirconia, into an organic compound binder for the purpose of heightening the hardness of a hard coating layer is known, and since such an inorganic particulate filler has a high refractive index of 1.6 to 2.7, the hard coating layer charged with such an inorganic particulate filler comes to have a high refractive index (on the order of 1.55 to 1.7).

When the hard coating layer 4 high in refractive index is stacked on a substrate film low in refractive index, such as cellulose acylate film, a difference in refractive index becomes large, and conspicuous interference unevenness develops.

As an example of a composition forming such a high refractive-index hard coating layer, the coating composition containing a multifunctional acrylate monomer as an ingredient to form resin for the hard coating layer and a powdery inorganic filler such as alumina or titanium oxide is disclosed in Japanese Patent No. 1815116. In addition, the photopolymerizable composition containing an inorganic loading material including alumina is disclosed in Japanese Patent No. 1416240.

On the other hand, it is also well known that a conductive substance is mixed into a hard coating layer, thereby imparting an antistatic property thereto. More specifically, conductivity can be imparted to a hard coating layer through the use of ATO (antimony-doped tin oxide), PTO (phosphorus-doped tin oxide) or ITO (tin-doped indium oxide) as fine particles of metal oxide. Such conductive fine particles of metal oxide are also high in refractive index, and cause the same problem as mentioned above. Examples of organic solvent-based transparent conductive paint are described in Komatsu Michio, *Hanshaboshimaku no Tokusei to Saiteki Sekkei • Maku Seisaku Gijutsu*, pp. 37-39, TECHNICAL INFORMATION INSTITUTE CO., LTD. (2001).

Although the case where a high refractive-index layer is required is explained above with a few examples being given, the invention should not be construed as being limited to these examples. The interference unevenness problem arises also in cases where high refractive-index hard coating layers are required for other purposes to result in appearance of differences in refractive index between the hard coating layers and a substrate film. The present substrate film is effective at reducing interference unevenness in those cases.

As another method for forming a high refractive-index hard coating layer, there is a method of forming a hard coating layer with a polymer having a high refractive index. Examples of a polymer having a high refractive index include polymers having cyclic groups and polymers containing halogen atoms other than fluorine atoms. Polymers containing both cyclic groups and halogen atoms other than fluorine atoms are also given as examples. The cyclic groups include aromatic groups, heterocyclic groups and alicyclic groups.

The hard coating layer 4 has no particular restriction as to its thickness. For the purpose of ensuring sufficient pencil hardness, however, it is appropriate that the hard coating layer thickness be 5 μm or above, preferably 8 μm or above, particularly preferably 10 μm or above. When the thickness is increased beyond 10 μm, there shows up an effect of rendering interference unevenness faint in synergy with the coherent length. Thus, combined use of such a hard coating layer and the present substrate film is particularly preferred because it tends to completely eliminate interference unevenness.

On the other hand, such a thickness increase makes it difficult to bend the film though it is effective in rendering the interference unevenness faint. Therefore the thickness of the hard coating layer 4 is preferably 60 μm or below, far preferably 50 μm or below, particularly preferably 40 μm or below.

Thus the suitable thickness of the hard coating layer 4 is from 5 μm to 60 μm, preferably from 8 μm to 50 μm, particularly preferably from 10 μm to 50 μm. The hard coating layer 4 is made up of one layer, but it may take a form including two or more layers.

The term "thickness of the hard coating layer" as used in the invention refers to the dimension between the pit-free surface area of the substrate film and the uppermost plane of the hard coating layer 4.

Furthermore, the thickness of the hard coating layer 4 is preferably two times or above, far preferably three times or above, particularly preferably five times or above, the depth of microscopic pits from the viewpoint of eliminating influences of the microscopic pits in the substrate film surface and rendering the layer surface smooth. When the thickness of the hard coating layer is two times or above the depth of the microscopic pits, it becomes easy to smooth the layer surface through leveling at the time of stacking of the hard coating layer.

The hard coating layer 4 can be formed by coating the substrate film with an active-energy beam cure coating solution through the use of a known thin-film forming method, such as a dipping method, a spinner method, a spraying method, a roll coater method, a gravure method, a wire bar method, a slot extrusion coater method (single layer or double layer) or a slide coater method, drying the coating layer and curing the dried coating layer by irradiation with active energy beams.

It is appropriate that the drying be carried out under conditions allowing reduction of the organic solvent concentration of the liquid coating film after drying to 5 mass % or below, preferably 2 mass % or below, far preferably 1 mass % or below. Although the drying conditions vary depending on thermal strength and transporting speed of the substrate, a length of the drying process and so on, it is advantageous to choose drying conditions ensuring minimization of the organic solvent content in point of polymerization-degree enhancement.

The hard coating layer 4 can also have a multilayer structure, and can also be formed by stacking layers as appropriate in order of increasing hardness.

Examples of fine particles of a metal oxide include particles having an average size of 100 nm or below, preferably 50 nm or below, and a refractive index of 1.6 or above, such as fine particles of titanium dioxide (having e.g. a rutile structure, a mixture of rutile and anatase structures, an anatase structure or an amorphous structure), tin oxide, iridium oxide, zinc oxide, zirconium oxide or aluminum oxide. Of these kinds of fine particles, fine particle of titanium dioxide are preferred over the others because their high refractive index allows reduction in addition amount.

For the purpose of enhancing an affinity between inorganic fine particles and an organic component, it is appropriate that the surface of each inorganic fine particle be treated with a surface modifier containing an organic segment, and it is advantageous for the surface modifier to have not only a functional group capable of forming a bond with each inorganic fine particle or being adsorbed to each inorganic fine particle but also a high affinity for a curable resin which can be cured by irradiation with active energy beams.

Suitable examples of a surface modifier having a functional group capable of forming a bond with and being adsorbed to each of inorganic fine particles include curable resins containing metal alkoxide moieties, such as silicon, aluminum, titanium or zirconium alkoxide moieties, and surface modifiers having anionic groups, such as a phosphoric acid group, a phosphonic acid group, a sulfuric acid group, a sulfonic acid group or a carboxylic acid group. As functional groups having high affinity for the organic component, groups merely combining organic moieties with hydrophilicity or hydrophobicity may suffice, but functional groups capable of being chemically bonded to the organic component, notably those having ethylenic unsaturated groups, are preferable.

The surface modifiers used suitably for fine particles of metal oxide in the invention are curable resins which each have both a metal oxide moiety or an anionic group and an ethylenic unsaturated group in one and the same molecule, and acrylic acid-copolymerized polymers having anionic groups such as carboxylic acid groups.

Typical examples of these surface modifiers include the following coupling agents having unsaturated double bonds, organic curable resins having phosphoric acid groups, organic curable resins having sulfuric acid groups, and organic curable resins having carboxylic acid groups.

| | |
|---|---|
| $H_2C=C(X)COOC_3H_6Si(OCH_3)_3$ | S-1 |
| $H_2C=C(X)COOC_2H_4OTi(OC_2H_5)_3$ | S-2 |
| $H_2C=C(X)COOC_2H_4OCOC_5H_{10}OPO(OH)_2$ | S-3 |
| $(H_2C=C(X)COOC_2H_4OCOO_5H_{10}O)_2POOH$ | S-4 |
| $H_2C=C(X)COOC_2H_4OSO_3H$ | S-5 |
| $H_2C=C(X)COO(C_5H_{10}COO)_2H$ | S-6 |
| $H_2C=C(X)COOC_5H_{10}COOH$ | S-7 |

(Herein X stands for H or $CH_3$.)

Surface modification of those inorganic fine particles is preferably conducted in a solution. More specifically, the surface modification may be made using a method of finely dispersing inorganic fine particles in the presence of a surface modifier by means of mechanical power, or a method of finely dispersing inorganic particles and then adding thereto a surface modifier and stirring them, or a method of subjecting inorganic fine particles to surface modification (and carrying out warming, drying and then heating, or a pH change, if needed) prior to fine dispersion, and then finely dispersing the surface-modified inorganic fine particles.

The solvent used for dissolving a surface modifier is preferably an organic solvent having a great polarity. Examples of such an organic solvent include known solvents such as alcohol, ketone and ester.

Examples of a polymerization initiator which produces radicals by irradiation with ultraviolet rays include known radical generators, such as acetophenones, benzophenones, Michler's ketone, benzoylbenzoate, benzoins, a-acyloxime ester, tetramethylthiuram monosulfide and thioxanthone. In addition, since sulfonium salts and iodonium salts usually adopted as photo-acid generators can also act as radical generators when irradiated with ultraviolet rays, they may be used alone in the invention. Further, a sensitizer in addition to a polymerization initiator may be used for the purpose of enhancing the sensitivity. Examples of the sensitizer include n-butylamine, triethylamine, tri-n-butylphosphine and thioxanthone derivatives.

The polymerization initiators may be used alone or as combinations of two or more thereof. The amount of polymerization initiators used falls preferably within a range of 0.1 mass % to 15 mass %, far preferably within a range of 1 mass % to 10 mass %, with respect to the total mass of ethylenically unsaturated group-containing curable resin and ring-opening polymerizable group-containing curable resin contained in a curable composition.

The refractive index of a high refractive-index layer including those curable resins which are cured by irradiation with high energy beams and fine particles of metal oxide is 1.6 or above, preferably 1.65 or above, and besides, it is preferably at least 0.2 higher than that of a low refractive-index layer.
(Antireflective Film)

An antireflective film 1' according to the invention is formed by the hard coating layer 4 of the hard coating film being stacked directly or via another layer with a low refractive-index layer 5 having a refractive index lower than that of the hard coating layer.

Suitable layer structures of the antireflective film 1' according to the invention are shown below.
<Layer Structure>

The following layer structures can be preferably applied to the antireflective film 1' according to the invention.
A: Transparent plastic substrate film/hard coating layer/low refractive-index layer
B: Transparent plastic substrate film/hard coating layer/high refractive-index layer/low refractive-index layer
C: Transparent plastic substrate film/hard coating layer/medium refractive-index layer/high refractive-index layer/low refractive-index layer Low refractive-index layers 5 which can be suitably used in the invention are explained below.

We have found that, when antireflective films are formed using the same hard coating film, the lower reflectivity the antireflective film has, the more noticeable interference unevenness it tends to develop, which will be illustrated in Examples. In other words, the lower reflectivity of an antireflective film has, the greater the necessity of applying the invention becomes. On the other hand, interference unevenness does not occur when the surface reflectivity is markedly low. Therefore the reflectivity is preferably from 0.05% to 3.0%, far preferably from 0.1% to 2.0%, particularly preferably 0.15% to 1.0%.

From these viewpoints, it is best for the antireflective film 1' according to the invention to have the layer structure C.
(Low Refractive-Index Layer)

In the invention, as mentioned above, it is a preferred form to provide a low refractive-index layer 5 outside the hard coating layer 4, or on the side distant from the substrate film 2. By providing a low refractive-index layer 5, an antireflective function can be imparted to the hard coating film. And it is appropriate that the low refractive-index layer 5 be adjusted to have a refractive index lower than that of the hard coating layer 4. When the difference in refractive index between the low refractive-index layer 5 and the hard coating layer 4 is too small, there occurs degradation in antireflective property; while, when such a difference is too large, there is a tendency of reflected light to take on a heavy color. Thus, the difference in refractive index between the low refractive-index layer and the hard coating layer is preferably from 0.01 to 0.40, far preferably from 0.05 to 0.30.

The low refractive-index layer 5 can be formed using a material having a low refractive index. As the material having a low refractive index, a binder having a low refractive index can be used. It is also possible to form the low refractive-index layer 5 by use of a binder into which fine particles are mixed.

A composition used for forming the low refractive-index layer 5 can also contain an organosilane compound as mentioned below.

As the binder having a low refractive index, a fluorine-containing copolymer can be used to advantage. And it is preferable that the fluorine-containing copolymer has a structural unit derived from a fluorine-containing vinyl monomer and a structural unit for imparting cross-linking properties.
<Fluorine-Containing Copolymer>

Examples of a fluorine-containing vinyl monomer as a main constituent of a fluorine-containing copolymer include fluoroolefins (such as fluoroethylene, vinylidene fluoride, tetrafluoroethylene and hexafluoropropylene), partially or completely fluorinated alkyl ester derivatives of (meth)acrylic acid (such as Biscoat 6FM, trade name, a product of Osaka Organic Chemical Industry Ltd., and R-2020, trade name, a product of Daikin Industries, Ltd.) and completely or partially fluorinated vinyl ethers. Of these monomers, perfluoroolefins are preferred over the others, and hexafluoropropylene in particular can be used to advantage in terms of refractive index, solubility, transparency and availability.

By increasing the proportion of such a fluorine-containing vinyl monomer in the composition of monomers, the film strength tends to decline though the refractive index can be lowered. In the invention, it is therefore appropriate to introduce a fluorine-containing vinyl monomer so that the fluorine content of the copolymer falls within a range of 20 mass % to 60 mass %, preferably 25 mass % to 55 mass %, particularly preferably 30 mass % to 50 mass %.

Examples of a structural unit for imparting cross-linking reactivity include the following structural unit groups (A), (B) and (C) in the main.
(A): Structural units obtained by polymerization of monomers having in advance self-cross-linking functional groups in their individual molecules, such as glycidyl (meth)acrylate and glycidyl vinyl ether
(B): Structural units obtained by polymerization of monomers having carboxyl, hydroxyl, amino or sulfo groups (e.g. (meth)acrylic acid, methylol (meth)acrylate, hydroxylalkyl (meth)acrylate, allyl acrylate, hydroxyethyl vinyl ether, hydroxybutyl vinyl ether, maleic acid, crotonic acid)
(C): Structural units obtained by allowing compounds having in each individual molecule a group capable of reacting with any of the functional groups in (A) and (B) and a cross-linkable functional group different from such a reactive group to react with the structural units in (A) and (B) (e.g. structural units capable of being synthesized in a process of allowing acrylic acid chloride to react on hydroxyl groups)

In the structural units of the group (C), the cross-linkable functional groups are preferably photopolymerizable groups. Examples of the photopolymerizable groups include a (meth)acryloyl group, an alkenyl group, a cinnamoyl group, a cinnamylideneacetyl group, a benzalacetophenone group, a styrylpyridine group, an a-phenylmaleimido group, a phenylazido group, a sulfonylazido group, a carbonylazido group, a diazo group, an o-quinonediazido group, a furylacryloyl group, a coumarin group, a pyron group, an anthracene group, a benzophenone group, a stilbene group, a dithiocarbamate group, a xanthate group, a 1,2,3-thiadiazole group, a cyclopropene group and an azadioxabicyclo group. One or more than one of these groups may be present in each structural unit. Of those groups, a (meth)acryloyl group and a cinnamoyl group, especially a (meth)acryloyl group, are preferred over the others.

As examples of a concrete method for preparing a photopolymerizable group-containing copolymer, the following methods can be given, but the methods usable in the invention should not be construed as being limited to these methods.

a. A method of esterifying a copolymer containing not only cross-linkable functional groups but also hydroxyl groups by allowing the copolymer to react with (meth)acrylic acid chloride.

b. A method of urethanating a copolymer containing not only cross-linkable functional groups but also hydroxyl groups by allowing the copolymer to react with an isocyanate-containing (meth)acrylic acid ester.

c. A method of esterifying a copolymer containing not only cross-linkable functional groups but also epoxy groups by allowing the copolymer to react with (meth)acrylic acid.

d. A method of esterifying a copolymer containing not only cross-linkable functional groups but also carboxyl groups by allowing the copolymer to react with an epoxy group-containing (meth)acrylic acid ester.

The amount of the photopolymerizable groups introduced can be controlled arbitrarily, and part of carboxyl groups or hydroxyl groups may be left without undergoing reaction from the viewpoints of coating surface condition stability, reduction of surface condition failures in the presence of inorganic particles and enhancement of film strength.

In the invention, the amount of structural units introduced into the copolymer for imparting cross-linking properties is preferably from 10 mole % to 50 mole %, far preferably from 15 mole % to 45 mole %, particularly preferably from 20 mole % to 40 mole %.

In addition to the repeating units derived from the fluorine-containing vinyl monomers and the structural units for imparting cross-linking properties, the copolymers useful for the low refractive-index layer in the invention may further contain structural units derived from other copolymerizable vinyl monomers as appropriate from various viewpoints including adhesion to the substrate, polymer's Tg (contributing to coating strength), solvent solubility, transparency, slipping ability, dust resistance and soil resistance. Such vinyl monomers may be used as combinations of two or more thereof, and the total amount of such vinyl monomers introduced is preferably from 0 to 65 mole %, far preferably from 0 to 40 mole %, particularly preferably from 0 to 30 mole %, based on the copolymer prepared.

The vinyl monomer units usable in combination with the foregoing structural units have no particular restrictions, and examples thereof can include olefins (such as ethylene, propylene, isoprene, vinyl chloride and vinylidene chloride), acrylic acid esters (such as methyl acrylate, ethyl acrylate, 2-ethylhexyl acrylate and 2-hydroxyethyl acrylate), methacrylic acid esters (such as methyl methacrylate, ethyl methacrylate, butyl methacrylate and 2-hydroxyethyl methacrylate), styrene derivatives (such as styrene, p-hydroxymethylstyrene and p-methoxystyrene), vinyl ethers (such as methyl vinyl ether, ethyl vinyl ether, cyclohexyl vinyl ether, hydroxyethyl vinyl ether and hydroxybutyl vinyl ether), vinyl esters (such as vinyl acetate, vinyl propionate and vinyl succinate), unsaturated carboxylic acids (such as acrylic acid, methacrylic acid, crotonic acid, maleic acid and itaconic acid), acrylamides (such as N,N-dimethylacrylamide, N-t-butylacrylamide and N-cyclohexylacrylamide), methacrylamides (such as N,N-dimethylmethacrylamide), and acrylonitrile.

Fluorine-containing copolymers especially useful in the invention are random copolymers of perfluoroolefins and vinyl ethers or vinyl esters. It is advantageous for them to have groups capable of causing cross-linking reaction by themselves in particular, such as radical reactive groups including (meth)acryloyl group, or ring-opening polymerizable groups including an epoxy group and an oxetanyl group. These cross-linking reactive group-containing polymerization units preferably constitute 5 to 70 mole %, especially 30 to 60 mole %, of the total polymerization units in the copolymer. Suitable examples of such copolymers include those disclosed in JP-2002-243907, JP-A-2002-372601, JP-A-2003-26732, JP-A-2003-222702, JP-A-2003-294911, JP-A-2003-329804, JP-A-2004-4444 and JP-A-2004-45462.

For the purpose of imparting soil resistance, it is appropriate that polysiloxane structures be further introduced in the fluorine-containing copolymers useful in the invention. Although the introduction of polysiloxane structures has no particular restriction as to its method, it is preferable to adopt the methods of introducing polysiloxane block copolymerizing components by the use of silicone macroazo initiators as disclosed e.g. in JP-A-6-93100, JP-A-11-189621, JP-A-11-228631 and JP-A-2000-313709, or the methods of introducing polysiloxane graft copolymerizing components by the use of silicone macromonomers as described in JP-A-2-251555 and JP-A-2-308806. Examples of compounds preferred in particular include the polymers in Examples 1, 2 and 3 of JP-A-11-189621 and the copolymers A-2 and A-3 in JP-A-2-251555. And it is appropriate that these polysiloxane components constitute 0.5 to 10 mass %, especially 1 to 5 mass %, of the resulting copolymer.

As to the molecular weight of copolymers which can be preferably used in the invention, the suitable mass-average molecular weight thereof is at least 5,000, preferably from 10,000 to 500,000, particularly preferably from 15,000 to 200,000. By combined use of polymers different in average molecular weight, improvements in coating surface condition and scratch resistance can be achieved.

Those copolymers may be used in combination with curing agents having polymerizable unsaturated groups when required, as disclosed in JP-A-10-25388 and JP-A-2000-17028. In addition, as disclosed in JP-A-2002-145952, it is preferable that those copolymers are used in combination with fluorine-containing compounds having multifunctional polymerizable unsaturated groups. Examples of a multifunctional polymerizable unsaturated group-containing compound include the multifunctional monomers referred to in the description of the hard coating layer. The combined use of these compounds and copolymers using polymerizable unsaturated group-containing compounds for their main bodies is preferable because its effect on improvement in scratch resistance is great.

The refractive index of the low refractive-index layer is preferably from 1.20 to 1.46, far preferably from 1.25 to 1.42, particularly preferably from 1.30 to 1.38. And the thickness of the low refractive-index layer is preferably from 50 nm to 150 nm, far preferably from 70 nm to 120 nm.

<Fine Particles>

Next the fine particles suitable for the low refractive-index layer in the invention are explained.

The coverage of fine particles contained in the low refractive-index layer is preferably from 1 m g/m$^2$ to 100 mg/mm$^2$, far preferably from 5 mg/m$^2$ to 80 mg/mm$^2$, further preferably from 5 mg/m$^2$ to 70 mg/mm$^2$. This is because the fine particles can have a clearly perceptible effect on improvement in scratch resistance as long as their coverage is beyond the lower limit and, as long as their coverage is below the upper limit, they can avoid troubles traceable to microscopic asperities on the surface of the low refractive-index layer, such as deteriorations in appearance and integrated reflectivity. And it is appropriate that the fine particles be low in refractive index because they are incorporated in the low refractive-index layer.

More specifically, the fine particles incorporated in the low refractive-index layer are preferably inorganic fine particles, inorganic fine particles of hollow structure or organic fine particles of hollow structure, especially preferably inorganic fine particles of hollow structure, and besides, they are preferably low in refractive index. Examples of such inorganic fine particles include fine particles of silica or hollow silica. The average particle size of such fine particles is preferably 30-100%, far preferably 30-80%, further preferably 35-70%, of the thickness of the low refractive-index layer. In other words, when the thickness of the low refractive-index layer is 100 nm, the average size of fine particles is preferably from 30 nm to 100 nm, far preferably from 30 nm to 80 nm, further preferably from 35 nm to 70 nm.

The (hollow) silica fine particles as specified above are used to advantage, because they have a clearly perceptible effect on improvement in scratch resistance when the average size thereof is beyond the lower limit and, when the average size thereof is below the upper limit, they can avoid troubles traceable to microscopic asperities on the surface of the low refractive-index layer, such as deteriorations in appearance and integrated reflectivity.

The (hollow) silica fine particles may be in a crystalline state or they may be in an amorphous state, and it doesn't matter whether they are monodisperse particles or aggregate particles (wherein the secondary particle size is preferably 30-100% of the thickness of the low refractive-index layer 5). Further, it also doesn't matter to use a mixture of two or more varieties of particles (differing in type or particle size). As to the particle shape, it is best for the particles to be spherical, but they may be indefinite in shape.

In order to lower the refractive index of the low refractive-index layer 5, the use of hollow silica fine particles is particularly advantageous. The refractive index of the hollow silica fine particles is preferably from 1.17 to 1.40, far preferably from 1.17 to 1.35, further preferably from 1.17 to 1.30. The term refractive index as used herein refers to the refractive index of each particle in its entirety, and does not represent the refractive index of hollow particle-forming shell silica alone. The porosity of hollow silica particles is preferably from 10% to 60%, far preferably from 20% to 60%, especially preferably from 30% to 60%. When it is intended to give a lower refractive index and a greater porosity to hollow silica particles, reduction in shell thickness is caused to result in lowering of particle strength. Therefore it is difficult to use particles of a low refractive index below 1.17 from a viewpoint of scratch resistance. Additionally, refractive index measurements on those hollow silica particles were made with an Abbe refractometer (made by ATAGO MFG. Co., Ltd.).

From a further viewpoint of improvement in soil resistance, it is appropriate in the invention that the low refractive-index layer be reduced in surface free energy. In the concrete, it is suitable for reduction in surface free energy to use a fluorine-containing compound or a compound having a polysiloxane structure.

Suitable examples of an additives having a polysiloxane structure include reactive group-containing polysiloxanes (e.g. KF-100t, X-22-169AS, KF-102, X-22-37011E, X-22-164B, X-22-5002, X-22-173B, X-22-174D, X-22-167B and X-22-161AS, trade names, products of Shin-Etsu Chemical Co., Ltd.; AK-5, AK-30 and AK-32, trade names, products of TOAGOSEI CO., LTD.; and Silaplain FM0725 and Silaplain FM0721, trade names, products of Chisso Corporation). In addition, the silicone compounds listed in Tables 2 and 3 of JP-A-2003-112383 are also suitable for use. These polysiloxane compounds are preferably added in an amount of 0.1 to 10 mass %, particularly preferably 1 to 5 mass %, based on the total solids of the low refractive-index layer.

In the invention, the low refractive-index layer 5 can also be formed simultaneously with a hard coating layer from one coating solution via phase separation by using the method disclosed in JP-A-2007-86764. In this case, it is possible to form a pseudo low refractive-index layer by incorporating fine particles low in both surface free energy and refractive index and/or a binder low in both surface free energy and refractive index into a coating composition, adjusting the coating thickness through the control of addition amounts of the fine particles and the binder, and localizing them to the side opposite to the substrate film's side in the layer cured after coating.

As the fine particles low in both surface free energy and refractive index, silica fine particles whose surfaces are modified with a fluorine-containing silane coupling agent are suitable. The silica fine particles subjected to such surface modification are preferably hollow silica fine particles. As the binder low in refractive index, the fluorine-containing copolymers referred to in the description of the low refractive-index layer are suitable.

(High Refractive-Index Layer/Medium Refractive-Index Layer)

In the present antireflective film, as mentioned above, a layer high in refractive index is provided between the low refractive-index layer and the hard coating layer, and thereby antireflective properties can be enhanced.

In the following description of this specification, the high refractive index layer and the medium refractive index layer are sometimes collectively called a high refractive index layer. Additionally, the adjectives "high", "medium" and "low" in the terms "high refractive index layer", "medium refractive index layer" and "low refractive index layer" describe a relative magnitude relation among refractive indexes of layers. As for the refractive index relation with the transparent substrate, it is preferable that the relations of transparent substrate>low refractive index layer and high refractive index layer>transparent substrate are satisfied.

In addition, sometimes a high refractive index layer, a medium refractive index layer and a low refractive index layer are collectively called "an antireflective layer".

When the antireflective film is made by forming a low refractive index layer on a high refractive index layer, the refractive index of the high refractive index layer is preferably from 1.55 to 2.40, far preferably from 1.60 to 2.20, further preferably from 1.65 to 2.10, especially preferably from 1.80 to 2.00.

When the antireflective film is made by coating the substrate film with a medium refractive index layer, a high refractive index layer and a low refractive index layer in order of increasing distance from the substrate film, the refractive index of the high refractive index layer is preferably from 1.65 to 2.40, far preferably from 1.70 to 2.20. And the refractive index of the medium refractive index layer is adjusted to be a value intermediate between the refractive index of the low refractive index layer and that of the high refractive index layer. The refractive index of the medium refractive index layer is preferably from 1.55 to 1.80.

The high refractive-index layer and the medium refractive-index layer are preferably formed from curable compositions each containing highly refractive inorganic fine particles and a binder. The highly refractive inorganic fine particles usable herein may be the inorganic fine particles of high refractive index which can be incorporated into the hard coating layer for refractive index enhancement.

The high refractive-index layer and the medium refractive-index layer for use in the invention are preferably formed by preparing coating compositions for formation of high refractive-index and medium refractive-index layers, preferably through addition of a binder precursor required for matrix formation (such as a multifunctional monomer or oligomer curable with ionizing radiation), a photopolymerization initiator and so on to a dispersion liquid prepared by dispersing inorganic particles into a dispersion medium, coating the substrate film with the coating compositions prepared for the high refractive-index and medium refractive index layers, and then curing the compositions through cross-linking reaction or polymerization reaction of the ionizing radiation curable compound (the multifunctional monomer, the multifunctional oligomer or so on).

Further, it is advantageous for the binders in the high refractive-index layer and the medium refractive-index layer to be subjected to cross-linking reaction or polymerization with the dispersing agent simultaneously with or subsequently to the coating of these layers.

Each of the binders of the thus formed high refractive-index layer and the medium refractive-index layer takes on e.g. such a form that the anionic groups of a dispersing agent used as preferred one are captured in the binder through the cross-linking or polymerization reaction between the dispersing agent and the ionizing radiation-curable multifunctional monomer or oligomer. Further, the binders of the high refractive-index layer and the medium refractive-index layer bring about improvements in physical strength, chemical resistance and weather resistance of inorganic particles-containing high refractive-index and medium refractive-index layers because the anionic groups have a function of maintaining the dispersed state of inorganic particles and the cross-linked or polymerized structure gives the binders the ability to form film.

The amount of a binder used in the high refractive-index layer is from 5 mass % to 80 mass % with respect to the solids content in a coating composition for forming the layer.

The content of inorganic particles in the high refractive-index layer is preferably. from 10 mass % to 90 mass %, far preferably from 15 mass % to 80 mass %, particularly preferably from 15 mass % to 75 mass %, with respect to the mass of the high refractive-index layer. Two or more varieties of inorganic particles may be incorporated into the high refractive-index layer.

When the high refractive-index layer has thereon the low refractive-index layer, it is preferred that the refractive index of the high refractive-index layer be higher than the refractive index of the transparent substrate.

For the high refractive-index layer, it is also advantageous to use a binder obtained by cross-linking or polymerization reaction of an ionizing radiation-curable compound containing an aromatic ring, an ionizing radiation-curable compound containing a halogen element other than fluorine (e.g. Br, I or Cl), or an ionizing radiation-curable compound containing S, N, P or like atom.

The thickness design of the high refractive-index layer can be prepared as appropriate according to its use. When the high refractive-index layer is used as an optical interference layer, the thickness thereof is preferably from 30 nm to 200 nm, far preferably from 50 nm to 170 nm, particularly preferably 60 nm to 150 nm.

<Formation of Layers>

The hard coating layer, low refractive-index layer and other layers relating to the invention are formed by coating a substrate film with coating solutions, respectively, heating and drying them, and then curing the monomers and curable resins incorporated for forming each of the layers through light irradiation and/or heating carried out on an as needed basis.

The layers constituting the present film have no particular restrictions as to their respective coating methods, and any of known methods, including a dip coating method, an air knife coating method, a curtain coating method, a roller coating method, a wire-bar coating method, a gravure coating method, an extrusion coating method (a die coating method) (see U.S. Pat. No. 2,681,294) and a microgravure coating method, are usable. Of these methods, a microgravure coating method and a die coating method are preferable to the others, and a die coating method is used to advantage from the viewpoint of delivering coating layers with high productivity.

It is advantageous for the drying of each constituent layer to be carried out under conditions that the organic solvent concentration of liquid film coated reaches 5 mass % or below, preferably 2 mass % or below, further preferably 1 mass % or below, after the drying. Although the drying conditions vary depending on thermal strength and transporting speed of the substrate, a length of the drying process and so on, it is appropriate in terms of film hardness and adhesion control that drying conditions ensuring minimization of the organic solvent content be chosen. When no organic solvent is present in the liquid film coated, it is possible to omit the drying step and to carry out UV irradiation immediately after the coating.

The cured layers in the invention may be subjected to heat treatment for the purpose of enhancing their degrees of crystallinity. The suitable heat-treatment temperature is from 40° C. to 130° C., and the heat-treatment time, though it can be chosen appropriately according to the required degree of crystallinity, is generally of the order of 5 minutes to 48 hours.

For the purpose of enhancing adhesion between the transparent substrate film and the cured layer, surface treatment according to e.g. an oxidation method or a method of forming asperities on the surface can be given to one surface or both surfaces of the transparent substrate film as required. Examples of the oxidation method include corona discharge treatment, glow discharge treatment, chromic acid treatment (wet method), flame treatment, hot-air treatment and ozone/ultraviolet irradiation treatment.

(Surface Treatment)

The transparent substrate may be subjected to surface treatment.

Examples of such surface treatment include chemical treatment, mechanical treatment, corona discharge treatment, flame treatment, UV irradiation treatment, high-frequency treatment, glow discharge treatment, activated plasma treatment, laser treatment, nitrating acid treatment and ozone oxidation treatment. Details on these treatments can be found e.g. in the description given by *JIII Journal of Technical Disclosure* No. 2001-1745, pp. 30-31 (published in Mar. 15, 2001), and in the description given by JP-A-2001-9973. Of those treatments, the use of glow discharge treatment, UV irradiation treatment, corona discharge treatment or flame treatment is preferable, and the use of glow discharge treatment or UV irradiation treatment is far preferable.

The substrate surface is rendered hydrophilic by such treatment, and thereby an increase in surface free energy is brought about. This increase is favorable for facilitating localization of fine particles having a low refractive index and high surface free energy, which are contained in a coating solution for forming the hard coating layer, onto the substrate surface.
(Saponification Treatment)

When the present hard coating film or antireflective film is used in an image display unit (preferably a liquid crystal display unit), an adhesive layer, for example, is provided on one side of the film, and the resultant film is placed on the top surface of the display. In the case where the substrate film is a cellulose acylate film, because triacetyl cellulose is used for forming a protective film to protect the polarizing layer of a polarizing plate, it is advantageous in terms of costs to use as the protective film the present hard coating film or antireflective film as it stands.

Saponification treatment can be carried out using any of known methods.
(Method for Coating Formation)

The present films can be formed using the following methods. However, methods usable for formation of the present films should not be construed as being limited to the following methods.

A coating solution containing ingredients for forming each layer is prepared first. Then the coating solution is coated on a transparent substrate by use of a dip coating method, an air knife coating method, a curtain coating method, a roller coating method, a wire-bar coating method, a gravure coating method or an extrusion coating method (see U.S. Pat. No. 2,681,294), and subjected to heating and drying. Of those coating methods, the use of a gravure coating method is preferable because a coating solution for forming each constituent layer of the antireflective layer, though it is small in application amount, can be coated in a layer of highly uniform thickness. A microgravure method included in the gravure coating method is far preferred because it can ensure higher uniformity to the coating thickness.

Alternatively, the use of a die coating method is also preferable because the method makes it possible to coat a small amount of coating solution in a layer of highly uniform thickness, ensures relatively easy thickness control by adopting a pre-metric system, and further lessens transpiration of a solvent from the coated area. Two or more layers may be coated simultaneously. Descriptions on the methods for simultaneous coating can be found e.g. in U.S. Pat. Nos. 2,761,791, 2,941,898, 3,508,947 and 3,526,528, and Yuji HARASAKI, Coating Kogaku, p. 253, Asakura Publishing Co., Ltd. (1973).
(Polarizing Plate)

A polarizing plate is mainly made up of a polarizing film and two protective films between which the polarizing film is sandwiched. The present hard coating film or antireflective film is preferably used as at least one of the two protective films between which a polarizing film is sandwiched. By allowing the present hard coating film or antireflective film to serve also as the protective film, the manufacturing cost of a polarizing plate can be reduced. Further, the use of the present hard coating film or antireflective film as the topmost layer of a polarizing plate, surrounding's reflection in the polarizing plate can be prevented, and the resultant polarizing plate is free of interference unevenness and excellent in scratch resistance and dust adhesion resistance.

As the polarizing film, any of known polarizing films can be used.

The polarizing plate utilizing the present hard coating film or antireflective film as one of its surface protective films can be preferably used in transmission-, reflection- or semitransmission-type liquid crystal display units of various modes, including a twisted nematic (TN) mode, a super twisted nematic (STN) mode, a vertical alignment (VA) mode, an in-plane switching (IPS) mode, an optically compensated bend cell (OCB) mode and so on.

EXAMPLES

The features of the invention are illustrated in more detail be reference to the following examples. Various changes and modifications can be made as appropriate to the ingredients, amounts used, proportions, contents and order of procedures and so on as shown in the following examples without departing from the spirit of the invention. Therefore the scope of the invention should not be construed as being limited to the following examples.
(Measurement Method)

First of all, methods for measuring and evaluating various characteristics determined in the following examples are described below.
1. Glass Transition Temperature (Tg)

Tg measurements are made with a differential scanning calorimeter (DSC) (DSC-8230, made by Rigaku Corporation). More specifically, each of polymer film samples before undergoing heat treatment is placed in an amount of the order of 5-6 mg on the DSC's measuring pan made of aluminum (Cat. No. 8578, a product of Rigaku Corporation). Under nitrogen flow with a velocity of 50 mL/min, each sample is heated from 25° C. to 120° C. at a temperature rise rate of 20° C./min, kept at 120° C. for 15 minutes, then cooled down to 30° C. at a rate of −20° C./min, and further heated again from 30° C. to 250° C. at a temperature rise rate of 20° C./min. The temperature at a point of intersection of each sample's thermogram measured during the foregoing process and the median line of two base lines is defined as each sample's glass transition temperature.
2. Crystallization Temperature (Tc)

Tc measurements are also made with a differential scanning calorimeter (DSC) (DSC-8230, made by Rigaku Corporation), and each of polymer film samples before undergoing heat treatment is placed in an amount of the order of 5-6 mg on the DSC's measuring pan made of aluminum (Cat. No. 8578, a product of Rigaku Corporation). Under nitrogen flow with a velocity of 50 mL/min, each sample is heated from 25° C. to 120° C. at a temperature rise rate of 20° C./min, kept at 120° C. for 15 minutes, then cooled down to 30° C. at a rate of −20° C./min, and further heated again from 30° C. to 250° C. at a temperature rise rate of 20° C./min. The starting temperature of an exothermic peak showing up during the foregoing process is defined as sample film's crystallization temperature.
3. Substitution Degree The acyl substitution degree of cellulose acylate is determined by the $^{13}$C-NMR spectrum analysis according to the method described in *Carbohydr. Res.*, 273 (1995) 83-91 (Tezuka et al.).
4. Haze, Total Transmittance and Parallel Transmittance Film specimens are sampled at 5 spots in the width direction of a test film (located in film's midsection, both edge sections (in the positions 5% of the full width away from both edges) and the two midsections between film's midsection and both edges), and at intervals of 100 m in the length direction as well. Herein, the specimens measuring 5 square centimeters in size are cut out and subjected to humidity control for 24 hours in the atmosphere of 25° C.-60% RH. Thereafter, haze measurements are made on these specimens by means of a haze meter (NDH 2000, made by NIPPON DENSHOKU INDUSTRIES CO., LTD.), and the average value of the thus obtained data is defined as the test film's haze. Additionally, in the case of haze measurement on a polymer solution, the procedure as mentioned above is followed.

For determination of total transmittance and parallel transmittance, the same samplings as described above are made and measurements are made according to the same method as described above. And the average values are calculated from the data obtained, and defined as test film's total transmittance and parallel transmittance, respectively.

5. Internal Haze

A film obtained is proved with several drops of paraffin on both front and rear sides, sandwiched between two glass plates 1 mm in thickness (plates of microslide glass with a product number S9111, made by MATSUNAMI), and pressed from the both sides so that the film and the two glass plates are brought into an optically complete contact, thereby creating a surface haze-free condition. In this situation, haze measurement is made. Separately, liquid paraffin alone is sandwiched between the same two glass plates as used in the above measurement, and haze measurement thereon is made. The internal haze (Hi) of the film is calculated by subtraction of the haze value obtained in the latter measurement from the haze value obtained in the former measurement.

6. Shape of Microscopic Pit

By a sampling of 5 spots in the transport direction of a film, referred to the central part of the film, test specimens measuring 5 square centimeters in size are cut out. And 100 microscopic pits are chosen arbitrarily from the test specimens, and examined for depths of the microscopic pits, the standard deviation of the depths, the average length of major diameters at the opening of the microscopic pits and the average length of minor diameters at the opening of the microscopic pits by means of a three-dimensional non-contact surface profile measuring system (a product of Ryoka Systems Inc.).

In addition, 100 regions measuring 1 square millimeter in area are chosen arbitrarily from the test specimens measuring 5 square centimeters in size, and examined for the number of microscopic pits per area, the standard deviation of the microscopic pit numbers and the average spacing between adjacent twos (at their respective central points) among microscopic pits by means of the same three-dimensional non-contact surface profile measuring system used in the above examination (a product of Ryoka Systems Inc.).

7. Internal Porosity in the Vicinity of Microscopic Pit

Cross-section SEM (scanning electron microscope) photographs of 10 spots chosen arbitrarily from the test specimens cut out for examination of "6. Shape of microscopic pit" are taken and, on each photograph, the total cross-sectional area and pore space in a portion having a length of 1 mm and extending from the flat surface area on the side having the microscopic pits to a plane situated in a distance of 5 µm to 15 µm in the thickness direction are measured, and a ratio of the pore space measured to the total cross-sectional area measured is calculated. And an average of these ratios in the 10 spots is worked out.

(Substrate Film Nos. 1 to 10 and 14)

<Manufacturing and Evaluation of Substrate Film>

The cellulose acylate described below in amounts shown in Table 1 and the mixture of additives described below were added to and dissolved in the mixed solvents having compositions shown in Table 1, and thereby cellulose acylate dopes were prepared. The preparation method of these dopes is described below.

Additionally, the cellulose acylate was dried by heating at 120° C. until the moisture content thereof was reduced to below 0.5 mass %, and then used in amounts (parts by mass) shown in Table 1.

1)<Cellulose Acylate>

Powder of cellulose acylate having a substitution degree of 2.86 was used. The cellulose acylate used had a viscosity average polymerization degree of 300, a 6-position acetyl substitution degree of 0.89, 7 mass % of acetone extract, a mass-average molecular weight/number-average molecular weight ratio of 2.3, a moisture content of 0.2 mass %, a viscosity of 305 mPa·s as measured in a 6 mass % dichloromethane solution, a remaining acetic acid quantity of at most 0.1 mass %, a Ca content of 65 ppm, an Mg content of 26 ppm, an iron content of 0.8 ppm, a sulfuric acid ion content of 18 ppm, an Yellow index of 1.9 and a free acetic acid quantity of 47 ppm. The average particle size of the powder was 1.5 mm, and the standard deviation was 0.5 mm.

2. <Solvent>

One or more than one solvent was chosen from the group consisting of dichloromethane (dielectric constant: 9), methanol (dielectric constant: 33), 1-butanol (dielectric constant: 17) and water (dielectric constant: 78), mixed in amounts (parts by mass) shown in Table 1, and used as each mixed solvent. Additionally, the moisture contents of the organic solvents used were 0.2 mass % or below.

3. <Additive>

The following additives were used in the proportions (mass %) in the parentheses, respectively, with respect to the amount of cellulose acylate used.

Triphenyl phosphate (8.0 mass %)
Biphenyl diphenylphosphate (4.0 mass %)

4)<Preparation of Cellulose Acylate Solution>

Into a 400-litle dissolving tank made of stainless and equipped with stirring blades, around which cooling water was made to circulate, the mixed solvent and additives described above were discharged, and while dispersing these ingredients with stirring, cellulose acylate was gradually added. After the conclusion of discharge, the stirring was continued for 2 hours at room temperature, then 3 hours was spent on swelling of the cellulose acylate, and further the stirring was pursued again. In this way, the cellulose acylate solution was prepared.

Additionally, the stirring was performed by use of both a dissolver-type deflection stirring shaft which stirred at a peripheral speed of 15 m/sec (shear stress: $5\times10^4$ kgf/m/sec$^2$ [$4.9\times10^5$ N/m/sec$^2$]) and a stirring shaft which had anchor vanes on the central axis and stirred at a peripheral speed of 1 m/sec (shear stress: $1\times10^4$ kgf/m/sec$^2$ [$9.8\times10^4$ N/m/sec$^2$]). The swelling was carried out under conditions that the high-speed stirring shaft was brought into a halt and the peripheral speed of the stirring shaft having anchor vanes was reduced to 0.5 m/sec. The swollen solution sent into a piping with jackets from the tank was heated up to 50° C., and further heated up to 90° C. by application of a pressure of 2 MPa. Thus, the cellulose acylate was completely dissolved. The heating time was 15 minutes. As the filter, housing and piping exposed to high temperatures during the foregoing process, those made from highly anticorrosive HASTELLOY alloy and provided with jackets through which a heating medium for thermal insulation and heating was made to circulate were used.

Then, the completely dissolved cellulose acylate was cooled down to 36° C. Thus, the intended cellulose acylate solution was prepared.

5)<Filtration>

The thus obtained cellulose acylate solution was filtered through a filter paper with an absolute filtration accuracy of 10 µm (#63, manufactured by Toyo Roshi Kaisha, Ltd.), and further filtered through a sintered metal filter with an absolute filtration accuracy of 2.5 µm (FH025, manufactured by Pall Corporation), thereby providing a polymer solution.

6)<Film Formation>

The cellulose acylate solution was warmed to 30° C., and cast onto a specular-surface stainless support having a band length of 60 m and a temperature setting of 15° C. through a cast geisser (as disclosed in JP-A-11-314233). Therein, the casting speed was set at 50 m/min, and the coating width was set at 200 cm. The space temperature of the whole casting area was set at 15° C. And the cellulose acylate film being cast and turned was peeled away at the location 50 cm back from the terminal of the casting region, and therein a dry air of 45° C. was made to blow. Next the thus dried film was subjected to 5 minutes' drying at 110° C., and further to 10 minutes' drying at 140° C. In this way, an 80 μm-thick cellulose acrylate film was obtained.

In the surface of Substrate Film No. 14 formed using a mixed solvent adjusted to have a water content of 0.2 mass %, no microscopic pit was formed.

(Substrate Film Nos. 11 to 13)<
<Substrate Film No. 11>

Another 80 μm-thick cellulose acylate film (Substrate Film No. 11) was formed in the same manner as the substrate films mentioned above, except that the dope used for forming Substrate Film No. 1 and the dope used for forming Substrate Film No. 9 were subjected to co-casting in accordance with a field block method so that the layer formed from the former dope lay in a thickness of 40 μm on the side of its interface with the air and the layer formed from the latter dope lay in a thickness of 40 μm on the side of the stainless support.

<Substrate Film No. 12>

Still another 80 μm-thick cellulose acylate film (Substrate Film No. 12) was formed in the same manner as the substrate films mentioned above, except that the dope used for forming Substrate Film No. 2 and the dope used for forming Substrate Film No. 9 were subjected to co-casting in accordance with a field block method so that the layer formed from the former dope lay in a thickness of 40 μm on the side of its interface with the air and the layer formed from the latter dope lay in a thickness of 40 μm on the side of the stainless support.

<Substrate Film No. 13>

A further 80 μm-thick cellulose acylate film (Substrate Film No. 13) was formed in the same manner as the substrate films mentioned above, except that the dope used for forming Substrate Film No. 5 and the dope used for forming Substrate Film No. 9 were subjected to co-casting in accordance with a field block method so that the layer formed from the former dope lay in a thickness of 40 μm on the side of its interface with the air and the layer formed from the latter dope lay in a thickness of 40 μm on the side of the stainless support.

Results of evaluations performed on each substrate film in accordance with the foregoing evaluation methods are shown in Table 2.

TABLE 1

|  | Amount of cellulose acylate added parts by mass | Solvent Composition ||||
|---|---|---|---|---|---|
|  |  | Dichloromethane parts by mass | Methanol parts by mass | Butanol parts by mass | Water parts by mass |
| Substrate Film No. 1 | 15 | 95.1 | 0.0 | 2.9 | 2.0 |
| Substrate Film No. 2 | 15 | 95.6 | 0.0 | 2.9 | 1.5 |
| Substrate Film No. 3 | 15 | 96.1 | 0.0 | 2.9 | 1.0 |
| Substrate Film No. 4 | 15 | 96.6 | 0.0 | 2.9 | 0.5 |
| Substrate Film No. 5 | 15 | 95.1 | 2.9 | 0.0 | 2.0 |
| Substrate Film No. 6 | 15 | 95.6 | 2.9 | 0.0 | 1.5 |
| Substrate Film No. 7 | 15 | 96.1 | 2.9 | 0.0 | 1.0 |
| Substrate Film No. 8 | 15 | 94.1 | 0.0 | 2.9 | 3.0 |
| Substrate Film No. 9 | 15 | 92.0 | 8.0 | 0.0 | 0.0 |
| Substrate Film No. 10 | 15 | 70.0 | 30.0 | 0.0 | 0.0 |
| Substrate Film No. 14 | 15 | 96.9 | 0.0 | 2.9 | 0.2 |

TABLE 2

| Substrate Film No. | Microscopic Pits |||||||| Tg [° C.] | Tc [° C.] | Total Haze [%] | Internal Haze [%] | Internal Porosity [%] | Total Transmittance [%] | Parallel Transmittance [%] |
|---|---|---|---|---|---|---|---|---|---|---|---|---|---|---|---|
|  | Shape | Depth [μm] | SD[1)] of Depths [μm] | Major Diameter of Opening [μm] | Minor Diameter of Opening [μm] | Spacing [μm] | Number [per mm$^2$] | SD[1)] of Numbers [per mm$^2$] |  |  |  |  |  |  |  |
| 1 | Circle | 1.2 | 0.05 | 3.0 | 3.0 | 45.0 | 498 | 20.0 | 155 | 200 | 21 | 0 | 1 | 90 | 72 |
| 2 | Circle | 1.2 | 0.05 | 2.9 | 2.9 | 58.0 | 300 | 12.0 | 155 | 200 | 13 | 0 | 1 | 91 | 73 |
| 3 | Circle | 1.1 | 0.04 | 2.9 | 2.9 | 70.0 | 206 | 8.3 | 155 | 200 | 9 | 0 | 1 | 92 | 74 |
| 4 | Circle | 1.1 | 0.04 | 2.8 | 2.8 | 100.0 | 101 | 4.1 | 155 | 200 | 5 | 0 | 1 | 92 | 74 |
| 5 | Ellipse | 3.2 | 0.10 | 15.2 | 15.0 | 15.8 | 4100 | 60.0 | 155 | 200 | 94 | 10 | 6 | 76 | 59 |
| 6 | Ellipse | 3.0 | 0.09 | 15.1 | 14.9 | 18.4 | 2970 | 47.0 | 155 | 200 | 72 | 5 | 3 | 80 | 15 |
| 7 | Ellipse | 2.8 | 0.08 | 13.3 | 13.2 | 22.5 | 1980 | 42.0 | 155 | 200 | 48 | 3 | 2 | 82 | 32 |
| 8 | Circle | 2.0 | 0.07 | 6.0 | 6.0 | 32.0 | 1000 | 28.0 | 155 | 200 | 28 | 1 | 1 | 88 | 65 |
| 9 | — | — | — | — | — | — | 0 | — | 155 | 200 | 0 | 0 | 1 | 93 | 93 |
| 10 | Ellipse | 2.2 | 0.15 | 8.5 | 8.3 | 34.0 | 830 | 33.3 | 155 | 200 | 35 | 5 | 6 | 78 | 61 |
| 11 | Circle | 1.0 | 0.04 | 2.8 | 2.8 | 200.0 | 25 | 1.0 | 155 | 200 | 2 | 0 | 1 | 93 | 75 |
| 12 | Circle | 1.0 | 0.04 | 2.8 | 2.8 | 220.0 | 21 | 0.8 | 155 | 200 | 2 | 0 | 1 | 92 | 75 |
| 13 | Circle | 1.8 | 0.06 | 5.0 | 5.0 | 36.5 | 798 | 36.0 | 155 | 200 | 42 | 0 | 1 | 90 | 53 |

[1)]SD stands for standard deviation.

All of these substrate films were found to be 1.48 in refractive index.

<Preparation of Coating Solution for Hard Coating Layer>

The composition described below was charged into a mixing tank and agitated for dissolution of ingredients therein, and thereby a coating solution for forming a hard coating layer was prepared.

Composition of Coating Solution for Hard Coating Layer (HCL-1):

| | |
|---|---|
| Methyl isobutyl ketone | 80.0 parts by mass |
| Methyl ethyl ketone | 20.0 parts by mass |
| Multifunctional acrylate partially modified with caprolactone (DPCA-20, produced by NIPPON KAYAKU Co., Ltd.) | 5.0 parts by mass |
| Photopolymerization initiator (Irgacure 184, produced by Ciba Specialty Chemicals) | 5.0 parts by mass |

Composition of Coating Solution for Hard Coating Layer (HCL-2):

| | |
|---|---|
| Methyl isobutyl ketone | 80.0 parts by mass |
| Methyl ethyl ketone | 20.0 parts by mass |
| NK Ester A-BPEF | 55.0 parts by mass |
| DPHA | 40.0 parts by mass |
| Photopolymerization initiator (Irgacure 907, produced by Ciba Specialty Chemicals) | 5.0 parts by mass |

NK Ester A-BPEF:
9,9-Bis[4-(2-acryloyloxyethoxy)phenyl]florene (produced by Shin-Nakamura Chemical Co., Ltd.)

DPHA: Mixture of dipentaerythritol pentaacrylate and dipentaerythritol hexaacrylate (produced by NIPPON KAYAKU Co., Ltd.)

<Preparation of Coating Solution for Medium Refractive-Index Layer (MNL-1)>

To 10.0 parts by mass of a hard coating agent containing $ZrO_2$ fine particles (DeSolite Z7404 produced by JSR Corp. [refractive index: 1.72, solids concentration: 60 mass %, particulate zirconium oxide content: 70 mass % (with respect to the solids content), average size of particulate zirconium oxide: around 20 nm, solvent composition: MIBK/MEK=9/1]), 3.0 parts by mass of a mixture of dipentaerythritol pentaacrylate and dipentaerythritol hexaacrylate mixture (DPHA), 0.1 parts by mass of a photopolymerization initiator (Irgacure 184, produced by Ciba Specialty Chemicals) and 86.9 parts by mass of methyl isobutyl ketone were added, and these ingredients were thoroughly stirred. Then the mixture obtained was passed through a polypropylene filter having a pore size of 0.4 μm. Thus, a coating solution for a medium refractive-index layer (MNL-1) was prepared.

<Preparation of Coating Solution for High Refractive-Index Layer (HNL-1)>

Methyl isobutyl ketone in an amount of 85.0 parts by mass was added to 15.0 parts by mass of a hard coating agent containing $ZrO_2$ fine particles (DeSolite Z7404 produced by JSR Corp. [refractive index: 1.72, solids concentration: 60 mass %, particulate zirconium oxide content: 70 mass % (with respect to the solids content), average size of particulate zirconium oxide: around 20 nm, solvent composition: MIBK/MEK=9/1]), and underwent agitation. The mixture obtained was passed through a polypropylene filter having a pore size of 0.4 μm, and thereby a coating solution for a high refractive-index layer (HNL-1) was prepared.

<Preparation of Coating Solution for Low Refractive-Index Layer (LNL-1)>

Preparation of Dispersion of Hollow Silica Particles:

Acryloyloxypropyltrimethoxysilane in an amount of 20 parts and diisopropoxyaluminum ethylacetate in an amount of 1.5 parts were added to and mixed into 500 parts of a hollow particulate silica sol (isopropyl alcohol silica sol, CS60-IPA, a product of Catalysts & Chemicals Ind. Co., Ltd., average particle size: 60 nm, shell thickness: 10 nm, silica concentration: 20%, refractive index of silica particles: 1.31), and thereto 9 parts of ion exchange water was further added. In the mixture obtained, reaction was made occur at 60° C. for 8 hours, and thereafter the reaction product was cooled to room temperature. Thereto, 1.8 parts of acetyl acetone was added to prepare a dispersion liquid. Thereafter, for the purpose of rendering the silica content almost uniform, the dispersion liquid was subjected to solvent displacement by reduced-pressure distillation under pressure of 30 Torr as cyclohexanone was added thereto. Finally, a dispersion liquid having a solids concentration of 18.2% was obtained though concentration adjustment. The amount of IPA remaining in the dispersion liquid obtained was found to be 0.5% or below by gas chromatographic analysis.

A coating solution having the following composition was prepared using the thus obtained hollow particulate silica dispersion liquid for forming a low refractive-index layer (LNL-1).

Composition of Coating Solution for Low Refractive-Index Layer (LNL-1):

| | |
|---|---|
| DPHA | 1.0 parts by mass |
| P-1 | 1.6 parts by mass |
| Hollow particulate silica dispersion Liquid (18.2%) | 26.4 parts by mass |
| RMS-033 | 0.4 parts by mass |
| Irgacure 907 | 0.3 parts by mass |
| M-1 | 1.9 parts by mass |
| MEK | 168.4 parts by mass |

P-1: Fluorine-containing copolymer P-3 disclosed in JP-A-2004-45462 (weight-average molecular weight: about 50,000)
DPHA: Mixture of dipentaerythritol pentaacrylate and dipentaerythritol hexaacrylate (produced by NIPPON KAYAKU Co., Ltd.)
Irgacure 907: Polymerization intiator (produced by Ciba Specialty Chemicals)
RMS-033: Methacryloxy-modified silicone (produced by Gelest Inc.)
M-1: Fluorine-containing multifunctional acrylate having the following structure;
M-1

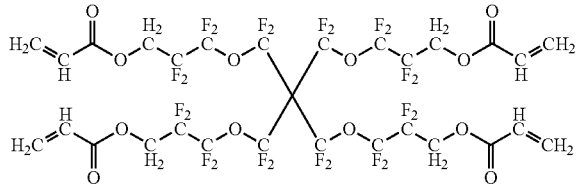 [SMILES: C=CC(=O)OCC(F)(F)C(F)(F)OC(F)(F)C(C(F)(F)OC(F)(F)C(F)(F)COC(=O)C=C)(C(F)(F)OC(F)(F)C(F)(F)COC(=O)C=C)C(F)(F)OC(F)(F)C(F)(F)COC(=O)C=C]

<Coating of Hard Coating Layer>

Any of Substrate Film Nos. 1 to 13, which were formed in advance into a roll, was chosen according to the indication in Table 3, and wound off and coated with the coating solution for a hard coating layer (HCL-1) or (HCL-2) extruded directly by means of a coater having a slot die. This coating operation was carried out at a transport speed of 30 m/min, and the coating layer was dried at 30° C. for 15 seconds first, and then dried at 90° C. for 20 seconds. The thus dried coating layer was further cured by irradiation with UV emitted from a 160-W/cm air-cooled metal halide lamp (made by Eye Graphics Co., Ltd.) in an exposure amount of 90 mJ/cm² under a nitrogen-purged atmosphere. In this way, a 10.0 mm-thick hard coating layer (HC-1) or a 10.0 μm-thick hard coating layer (HC-2) was coated on each substrate film, and wound into a roll. Thus, a roll-form hard coating film was made.

The hard coating layer (HC-1) was found to be 1.52 in refractive index, and the hard coating layer (HC-2) was found to be 1.60 in refractive index.

Additionally, as to a hard coating layer (HC-1a), a hard coating layer (HC-1b) and a hard coating layer (HC-1c) using 1LR of Reference Example 1, 2LR of Reference Example 2 and 3LR of Reference Example 3, respectively, the arithmetic average roughness Ra of their individual surfaces was adjusted by controlling the drying time in the process of layer formation.

(Making of LR Film)

The symbol "LR" in Table 3 stands for a LR film, and the LR film refers to an antireflective film having only a low refractive-index layer on a hard coating layer. Each hard coating film formed into a roll in a state that its hard coating layer was stacked on its substrate film was wound off, and coated with the coating solution (LNL-1) for the low refractive-index layer on the side of the hard coating layer through direct extrusion using a coater with a slot die, and then dried for 60 seconds at 60° C. While purging the air by nitrogen until the oxygen concentration in the air was reduced to 0.1 vol % or below, the coating solution applied was cured under illuminance of 600 mW/cm² through irradiation with UV emitted from a 240-W/cm air-cooled metal halide lamp (made by Eye Graphics Co., Ltd.) in an exposure amount of 600 mJ/cm². In this way, a low refractive-index layer having an average thickness of 90 nm was coated on each hard coating film, and wound into a roll. Thus, a roll-form antireflective film was made. The low refractive-index layer was found to be 1.36 in refractive index.

(Making of AR Film)

The symbol "AR" in Table 3 stands for an AR film, and the AR film refers to an antireflective film having on the hard coating layer an antireflective layer of triple-layer structure including a medium refractive-index layer, a high refractive-index layer and a low refractive-index layer.

<Stacking of Medium Refractive-Index Layer>

Each hard coating film formed into a roll in a state that its hard coating layer was stacked on its substrate film was wound off, and coated with the coating solution (MNL-1) for a medium refractive-index layer on the side of the hard coating layer through direct extrusion using a coater with a slot die, and then dried for 30 seconds at 90° C. While purging the air by nitrogen until the oxygen concentration in the air was reduced to 1.0 vol % or below, the coating solution applied was cured under illuminance of 400 mW/cm² through irradiation with UV emitted from a 180-W/cm air-cooled metal halide lamp (made by Eye Graphics Co., Ltd.) in an exposure amount of 240 mJ/cm². In this way, a medium refractive-index layer having an average thickness of 60 nm was coated on each hard coating film, and wound into a roll. The medium refractive-index layer was found to be 1.62 in refractive index.

<Stacking of High Refractive-Index Layer>

Following the stacking of the medium refractive-index layer, the roll-form film having undergone stacking of the medium refractive-index layer was wound off, and coated with the coating solution for a high refractive-index layer (HNL-1) on the side of its medium refractive-index layer through direct extrusion using a coater with a slot die, and then dried for 30 seconds at 90° C. While purging the air by nitrogen until the oxygen concentration in the air was reduced to 1.0 vol % or below, the coating solution applied was cured under illuminance of 400 mW/cm² through irradiation with UV emitted from a 240-W/cm air-cooled metal halide lamp (made by Eye Graphics Co., Ltd.) in an exposure amount of 240 mJ/cm². In this way, a high refractive-index layer having an average thickness of 112 nm was formed on the medium refractive-index layer, and wound into a roll. The high refractive-index layer was found to be 1.72 in refractive index.

<Stacking of Low Refractive-Index Layer>

Following the stacking of the high refractive-index layer, the roll-form film having undergone stacking of the high refractive-index layer was wound off, and coated with the coating solution for a low refractive-index layer (LNL-1) on the side of its high refractive-index layer through direct extrusion using a coater with a slot die, and then dried for 60 seconds at 60° C. While purging the air by nitrogen until the oxygen concentration in the air was reduced to 0.1 vol % or below, the coating solution applied was cured under illuminance of 600 mW/cm² through irradiation with UV emitted from a 240-W/cm air-cooled metal halide lamp (made by Eye Graphics Co., Ltd.) in an exposure amount of 600 mJ/cm². In this way, a low refractive-index layer having an average thickness of 90 nm was formed on the high refractive-index layer, and wound into a roll. Thus, an antireflective film having an antireflective layer of triple-layer structure was made. The low refractive-index layer formed therein was found to be 1.36 in refractive index.

(Evaluations on Hard Coating Film and Antireflective Film)

Evaluations of various properties were performed on each film sample in accordance with the following methods. The evaluation results obtained are shown in Table 3.

(1) Average Integrated Reflectivity

The back of each film sample (the surface on the side where no hard coating layer is present) is roughened by use of sand paper, and then treated with black ink. Thereby, back reflection is eliminated from the film sample. The surface of the film sample is mounted on the integrating sphere of a spectrophotometer V-550 (made by JASCO Corporation), and reflectivity (integrated reflectivity) measurements are made in a wavelength region from 380 nm to 780 nm. From the date obtained, the average reflectivity in the 450- to 650-nm range is calculated, and thereby an antireflective property of each film sample is evaluated.

(2) Surface Profile Evaluation

As to the surface profile of each film sample, evaluations of the arithmetic average roughness (Ra) and average spacing (Sm) of asperities on the surface are made on the basis of JIS B-0601 (1994) through measurements using SURFCORDER Model SE-3F made by Kosaka Laboratory, Ltd. and a two-dimensional roughness measuring system, SJ-400 made by Mitutoyo Corporation.

In Sm measurements, the measuring length is set at 8 mm and the value chosen as a cutoff value is 0.8 mm.

(3) Interference Unevenness Evaluation

Each film sample the back of which has been roughened by rubbing with sand paper and treated with black ink, and thereby freed from back reflection, is placed on a desk, and the surface thereof is illuminated from above 30 cm by means of a three-wavelength fluorescent lamp (National Palook fluorescent lamp FL20SS • ED-D/18). Under this condition, interference unevenness showing up on the sample film surface is observed and graded from A to E according to the following criteria.

A: Interference unevenness is not visible at all.
B: Interference unevenness is hardly visible.
C: Interference unevenness is slightly visible.

D: Interference unevenness is plainly visible.
E: Interference unevenness is badly visible.

(4) Haze

The film haze refers to the haze value defined by JIS-K7105, and the value automatically determined as Haze= (diffused light/total transmitted light)×100(%) through the measurement with a turbidimeter, NDH-1001DP made by NIPPON DENSHOKU INDUSTRIES CO., LTD., based on the measuring method defied by RS-K7361-1 is adopted as a haze value of each sample film.

(5) Blurring of Characters

Each film sample is mounted on a monitor having 15-inch clear surface (smooth surface). On the monitor's screen, two kinds of very complex MS Ming-cho type characters (which each are formed with 16 strokes) of font sizes 8, 9 and 10 are produced by means of a word processor and displayed in 100% size. These characters are visually checked from above 30 cm, and graded from A to D according to the following criteria.

A: The characters of font size 8 are clearly visible.
B: The characters of font size 9 or greater are clearly visible.
C: The characters of font size 10 are clearly visible.
D: All the characters of font sizes 8 to 10 look blurred.

(6) Pencil Hardness

After each film sample is subjected to moisture control for 2 hours under conditions of 25° C.-60% RH, a load of 4.9N is imposed thereon by using test pencils defined by JIS-6006. And in accordance with the pencil hardness evaluation method defined by RS-K-5400, the hardness of the pencil making no scratch on the film is defined as pencil hardness.

Results of the measurements are shown in Table 3.

From the results shown in Table 3, the following are evident.

The hard coating films having hard coating layers stacked directly on transparent plastic substrate films having microscopic pits specific in shape and number on their respective surfaces can avoid interference unevenness which is caused in hard coating films lacking in such microscopic pits.

By incorporating the present substrate films reduced in internal haze through the use of water-containing mixed solvents, the hard coating films can avoid interference unevenness without attended by rises in haze.

The hard coating films incorporating the substrate films having microscopic pits made in their surfaces through the use of mixed solvents including organic solvents and water have advantages of being low in haze and high in pencil hardness, as compared with the hard coating films incorporating the substrate films formed through the use of organic solvents alone.

Although the reflectivity can be lowered by stacking an antireflective layer on the surface of a hard coating film, the lower reflectivity an antireflective layer has, the more the interference unevenness is apt to show up on the layer. Even in the hard coating films having reflectivity reduced to 0.5% or below, interference unevenness can be reduced in its tendency to show up by increasing the number of microscopic pits to at least 100 per mm$^2$.

With respect to the hard coating films incorporating hard coating layers raised in refractive index, an increase in the number of microscopic pits causes an increase in haze. However, by reducing the number of microscopic pits to 1,000 per mm$^2$ or below, the effect of preventing interference unevenness while controlling a rise in haze can be produced.

TABLE 3

| | Substrate Film No. | Number of microscopic pits [per mm$^2$] | Internal Hz (%) | HC | Anti-reflective layer | Ra [μm] | Reflectivity [%] | Interference Unevenness | Hz [%] | Blurring of Characters | Pencil Hardness |
|---|---|---|---|---|---|---|---|---|---|---|---|
| Example 1LR | 1 | 498 | 0 | HC-1 | single | 0.01 | 1.5 | A | 0 | A | 4H |
| Compar. Example 1LR | 9 | 0 | 0 | HC-1 | single | 0.01 | 1.5 | E | 0 | A | 4H |
| Ref. Example 1LR | 9 | 0 | 0 | HC-1a | single | 0.02 | 1.5 | E | 0 | A | 4H |
| Ref. Example 2LR | 9 | 0 | 0 | HC-1b | single | 0.04 | 1.5 | D | 2 | B | 4H |
| Ref. Example 3LR | 9 | 0 | 0 | HC-1c | single | 0.05 | 1.5 | C | 3 | C | 4H |
| Example 2LR | 2 | 300 | 0 | HC-1 | single | 0.01 | 1.5 | A | 0 | A | 4H |
| Example 3HC | 3 | 206 | 0 | HC-1 | absent | 0.01 | 4.0 | A | 0 | A | 4H |
| Example 3LR | 3 | 206 | 0 | HC-1 | single | 0.01 | 1.5 | A | 0 | A | 4H |
| Example 3AR | 3 | 206 | 0 | HC-1 | triple | 0.01 | 0.5 | A | 0 | A | 4H |
| Example 4HC | 4 | 101 | 0 | HC-1 | absent | 0.01 | 4.0 | A | 0 | A | 4H |
| Example 4LR | 4 | 101 | 0 | HC-1 | single | 0.01 | 1.5 | A | 0 | A | 4H |
| Example 4AR | 4 | 101 | 0 | HC-1 | triple | 0.01 | 0.5 | B | 0 | A | 4H |
| Example 5HC | 11 | 25 | 0 | HC-1 | absent | 0.01 | 4.0 | A | 0 | A | 4H |
| Example 5LR | 11 | 25 | 0 | HC-1 | single | 0.01 | 1.5 | B | 0 | A | 4H |
| Example 5AR | 11 | 25 | 0 | HC-1 | triple | 0.01 | 0.5 | C | 0 | A | 4H |
| Compar. Example 2AR | 12 | 21 | 0 | HC-1 | triple | 0.01 | 0.5 | D | 0 | A | 4H |
| Example 6LR | 10 | 830 | 5 | HC-1 | single | 0.01 | 1.5 | A | 6 | C | 2H |
| Example 7LR | 13 | 798 | 1 | HC-1 | single | 0.01 | 1.5 | A | 0 | A | 4H |
| Example 8LR | 8 | 1,000 | 1 | HC-1 | single | 0.01 | 1.5 | A | 1 | A | 4H |
| Example 9LR | 7 | 1,980 | 3 | HC-1 | single | 0.01 | 1.5 | A | 3 | B | 4H |
| Example 10LR | 6 | 2,870 | 5 | HC-1 | single | 0.02 | 1.5 | A | 5 | C | 3H |
| Compar. Example 3LR | 5 | 4,100 | 10 | HC-1 | single | 0.03 | 1.5 | A | 10 | D | 2H |
| Example 11LR | 1 | 498 | 0 | HC-2 | single | 0.01 | 1.0 | A | 1 | A | 4H |
| Example 12LR | 8 | 1,000 | 3 | HC-2 | single | 0.01 | 1.0 | A | 5 | C | 4H |
| Compar. Example 4LR | 7 | 2,022 | 5 | HC-2 | single | 0.01 | 1.0 | A | 11 | D | 4H |

As to the abbreviations in the above table, "internal Hz" stands for an internal haze, "Hz" for haze of a hard coating film or an antireflective film, "compar." for comparative and "ref." for reference.

When the refractive index of a hard coating layer is high, the presence of a greater number of microscopic pits in the substrate surface tends to cause the more increase in haze. Therefore, a reduction of the number of microscopic pits to 500 mm² or below is preferable because it allows control of haze increase even in the high refractive-index hard coating layer.

The smaller arithmetic average roughness Ra a hard coating layer has, the more the interference unevenness is apt to show up on the hard coating layer. When Ra is 0.04 μm or blow, particularly 0.02 μm or below, interference unevenness tends to show up more likely. On the other hand, when Ra becomes greater, the blurring of characters tends to become worse.

The internal porosity is preferably 3% or below because the use of substrate films high in internal porosity causes lowering of pencil hardness.

The depth of microscopic pits in the substrate surface is preferably 3.0 μm or below because the depth increased beyond 3.0 μm causes a substantial increase in the arithmetic average roughness Ra.

(Making of Polarizing Plate)

The back of each of the films made in the foregoing manners was subjected to alkali saponification treatment. Each film was immersed in a 1.5N water solution of sodium hydroxide for 2 minutes at 55° C., washed in a washing bath at room temperature, and then neutralized with 0.1N sulfuric acid at 30° C. The thus treated film was washed again in a washing bath at room temperature, and further dried with hot air of 100° C. Separately, a 20 μm-thick polarizing film was prepared by stretching, in continuous operation, 80 μm-thick roll-form polyvinyl alcohol film to 5 times in an aqueous solution of iodine, and then by drying the film thus stretched. The thus prepared polarizing film was sandwiched between each of the films having undergone the foregoing alkali saponification treatment and Fuji TAC TD80UL (manufactured by FUJIFILM CORPORATION) having undergone the same alkali saponification treatment so that the alkali saponified surfaces were brought into face-to-face contact with the polarizing film, and stacked together by using as an adhesive a 3% aqueous solution of polyvinyl alcohol (PVA-117H, produced by KURARAY CO., LTD.). Thus, the polarizing plate having each of the films and TD80UL as protective films of the polarizing film was made.

(Making Liquid Crystal Display Unit)

The polarizing plate and phase-contrast film provided on the display screen's side of a VA-mode liquid crystal display unit (LC-37GS10, manufactured by SHARP CORPORATION) were peeled away and, instead of them, each of the polarizing plates made by the foregoing manner was stuck with an adhesive so that the transmission axis of the polarizing plate matched up with that of the polarizing plate originally attached to the manufactured product. Thus, the liquid crystal display units having the hard coating films or antireflective films formed in Examples and Comparative Examples, respectively, were made. Additionally, each hard coating film or each antireflective film were stuck so as to lie on the viewing side.

The thus made polarizing plates and image display units into which the hard coating films or antireflective films of Examples were incorporated, respectively, were superior in property of preventing interference unevenness in comparison with those into which the hard coating films or antireflective films of Comparative Examples were incorporated, as is the cases with the hard coating films or the antireflective films incorporated therein. The image display units incorporating the antireflective films of Examples were low in reflectivity, reduced in backgrounds' reflection and very high in display quality.

Then, differences between the present substrate film having microscopic pits in the surface and a substrate film having microscopic projections on the surface are illustrated.

<Making of Roll-Form Substrate Film No. 1>

Substrate Film No. 1 having a width of 1.50 m, a length of 2,000m and a thickness of 80 μm was formed in the same manner as the foregoing Substrate Film No. 1 and wound into a roll. Herein, two rolls of Substrate Film No. 1 were prepared.

<Making of Roll-Form Substrate Film No. 15>

Substrate Film No. 15 having a width of 1.50 m, a length of 2,000 m and a thickness of 80 μm was formed in the same manner as the foregoing Substrate Film No. 9, except that the specular-surface stainless supports used were different from each other, and wound into a roll. Herein, two rolls of Substrate Film No. 15 were prepared. The specular-surface stainless support used herein was pitted in advance so as to form such projections specified in number and shape as shown in Table 4 on the Substrate Film No. 15 surface.

Evaluations on Substrate Film No. 15 were made according to the same method as used for evaluations on Substrate Film No. 1.

Results obtained are shown in Table 4.

TABLE 4

| | | | Microscopic Projections | | | | | | | | | | | |
|---|---|---|---|---|---|---|---|---|---|---|---|---|---|---|
| Substrate Film No. | Shape | Height [μm] | SD[1] of Height [μm] | Major Diameter at Bottom [μm] | Minor Diameter at Bottom [μm] | Spacing [μm] | Number [per mm²] | SD[1] of Numbers [per mm²] | Tg [° C.] | Tc [° C.] | Total Haze [%] | Internal Haze [%] | Internal Porosity [%] | Total Transmittance [%] | Parallel Transmittance [%] |
| 15 | circle | 12 | 0.05 | 3.0 | 3.0 | 45.0 | 498 | 20.0 | 155 | 200 | 21 | 0 | 1 | 90 | 72 |

[1]SD stands for standard deviation.

On the day following the making of Substrate Film No. 1 and Substrate Film No. 15 and after a lapse of 3 months from the making of them, the hard coating layer and the low refractive-index layer were stacked on each Substrate Film in the same manner as in Example 1LR, and thereby antireflective films were prepared. These films were evaluated by the same methods as in Example 1LR. Test specimens used for evaluations were sampled at the position 100 m away from the spool side after each substrate film was stored in the form of roll. Evaluation results obtained are shown in Table 5.

Observations of test specimens of Substrate Film No. 15 after 3-month storage revealed that the microscopic projections on the film surface had become flat. In contrast to this, the same microscopic pits as observed in the test specimens of Substrate Film No. 1 just after the film making were observed in those after 3-month storage.

TABLE 5

| | Coating of HC Layer | Substrate Film No. | Internal Hz (%) | HC | Anti-reflective layer | Ra [μm] | Reflectivity [%] | Interference Unevenness | Hz [%] | Blurring of Characters | Pencil Hardness |
|---|---|---|---|---|---|---|---|---|---|---|---|
| Example 21LR | next day | 1 | 0 | HC-1 | single | 0.01 | 1.5 | A | 0 | A | 4H |
| | after 3 months | 1 | 0 | HC-1 | single | 0.01 | 1.5 | A | 0 | A | 4H |
| Comparative Example 21LR | next day | 15 | 0 | HC-1 | single | 0.01 | 1.5 | A | 0 | A | 4H |
| | after 3 months | 15 | 0 | HC-1 | single | 0.01 | 1.5 | D | 0 | A | 4H |

From the results shown above, the following are evident.

The substrate film having microscopic projections on its surface is able to deliver the effect of preventing interference unevenness when a hard coating layer is stacked thereon just after the making thereof, but it suffers crush of its microscopic projections during the long-term storage and loses the effect of preventing interference unevenness.

In contrast to this, the substrate film having microscopic pits in its surface is able to deliver the effect of preventing interference unevenness even after the long-term storage.

What is claimed is:

1. A hard coating film comprising:
    a transparent plastic substrate film; and
    a hard coating layer,
    wherein the transparent plastic substrate film has mutually independent microscopic pits in at least one surface thereof,
    wherein the microscopic pits each independently have a depth of 3 μm or below,
    wherein the microscopic pits have an average length of major diameters of from 0.5 μm to 20 μm,
    wherein the number of the microscopic pits is from 25 to 3,000 per mm$^2$, and wherein the transparent plastic substrate film has an internal porosity of 10% or below in a region extending from a flat surface area on a side having the microscopic pits to a plane situated in a distance of 5 μm to 15 μm in a thickness direction of the transparent plastic substrate film.

2. The hard coating film as claimed in claim 1, wherein the transparent plastic substrate film has an internal haze of 5% or below.

3. The hard coating film as claimed in claim 1, wherein the microscopic pits in the surface of the transparent plastic substrate film are from 200 to 1,000 in number per square millimeter.

4. The hard coating film as claimed in claim 1, wherein the microscopic pits of the transparent plastic substrate film are from 1.0 μm to 8 μm in average length of the major diameters.

5. The hard coating film as claimed in claim 1, which has a surface having an arithmetic average roughness Ra of 0.04 μm or below.

6. The hard coating film as claimed in claim 1, wherein the transparent plastic substrate film is a film containing cellulose acylate polymer as a main constituent.

7. The hard coating film as claimed in claim 1, wherein the transparent plastic substrate film is a film obtained by: preparing a polymer solution through dissolution of a polymer composition in a mixed solvent containing at least two solvents that include a solvent having a dielectric constant of 35 or above and that are incompatible with each other; and forming the polymer solution into film.

8. The hard coating film as claimed in claim 7, wherein the mixed solvent is a solvent containing the solvent having a dielectric constant of 35 or above in a proportion of 0.3 mass % to 30 mass %.

9. The hard coating film as claimed in claim 7, wherein the mixed solvent is a solvent further containing a solvent having a dielectric constant of 2 to below 10 and a solvent having a dielectric constant of 10 to below 35.

10. The hard coating film as claimed in claim 7, wherein the solvent having a dielectric constant of 35 or above is water.

11. The hard coating film as claimed in claim 1, wherein a difference in refractive index between the hard coating layer and the transparent plastic substrate film is 0.02 or above.

12. An antireflective film comprising:
    a hard coating film comprising:
        a transparent plastic substrate film; and
        a hard coating layer,
        wherein the transparent plastic substrate film has mutually independent microscopic pits in at least one surface thereof,
        wherein the microscopic pits each independently have a depth of 3 μm or below,
        wherein the microscopic pits have an average length of major diameters of from 0.5 μm to 20 μm,
        wherein the number of the microscopic pits is from 25 to 3,000 per mm$^2$, and
        wherein the transparent plastic substrate film has an internal porosity of 10% or below in a region extending from a flat surface area on a side having the microscopic pits to a plane situated in a distance of 5 μm to 15 μm in a thickness direction of the transparent plastic substrate film; and
    a low refractive-index layer which is lower in refractive index than the hard coating layer of the hard coating film, the low refractive-index layer being stacked on the hard coating layer directly or via another layer.

13. A polarizing plate comprising:
    a polarizing film and protective films on both sides of the polarizing film,
    wherein at least one of the protective films is a hard coating film comprising:
        a transparent plastic substrate film; and
        a hard coating layer,
        wherein the transparent plastic substrate film has mutually independent microscopic pits in at least one surface thereof,
        wherein the microscopic pits each independently have a depth of 3 μm or below,
        wherein the microscopic pits have an average length of major diameters of from 0.5 μm to 20 μm,
        wherein the number of the microscopic pits is from 25 to 3,000 per mm$^2$, and
        wherein the transparent plastic substrate film has an internal porosity of 10% or below in a region extending from a flat surface area on a side having the microscopic pits to a plane situated in a distance of 5 μm to 15 μm in a thickness direction of the transparent plastic substrate film.

14. An image display unit comprising:
a hard coating film comprising:
- a transparent plastic substrate film; and
- a hard coating layer,
- wherein the transparent plastic substrate film has mutually independent microscopic pits in at least one surface thereof,
- wherein the microscopic pits each independently have a depth of 3 μm or below,
- wherein the microscopic pits have an average length of major diameters of from 0.5 μm to 20 μm,
- wherein the number of the microscopic pits is from 25 to 3,000 per $mm^2$, and
- wherein the transparent plastic substrate film has an internal porosity of 10% or below in a region extending from a flat surface area on a side having the microscopic pits to a plane situated in a distance of 5 μm to 15 μm in a thickness direction of the transparent plastic substrate film.

* * * * *